(12) United States Patent
Higuchi et al.

(10) Patent No.: US 6,734,894 B1
(45) Date of Patent: May 11, 2004

(54) ELECTRONIC-ENDOSCOPE LIGHT QUANTITY CONTROLLING APPARATUS

(75) Inventors: Mitsuru Higuchi, Omiya (JP); Shinji Takeuchi, Omiya (JP); Kazuhiro Yamanaka, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/249,777

(22) Filed: Feb. 16, 1999

(30) Foreign Application Priority Data

| Feb. 18, 1998 | (JP) | ................................. | 10-054422 |
| Feb. 20, 1998 | (JP) | ................................. | 10-055937 |
| Feb. 20, 1998 | (JP) | ................................. | 10-055938 |
| Feb. 20, 1998 | (JP) | ................................. | 10-055939 |
| Mar. 25, 1998 | (JP) | ................................. | 10-096784 |

(51) Int. Cl.$^7$ ............................................. H04N 7/18
(52) U.S. Cl. ...................... 348/69; 348/363; 600/180
(58) Field of Search ..................... 348/61, 65, 68–71, 348/296, 363, 370; 600/101, 160, 180, 181, 178, 109; H04N 7/18

(56) References Cited

U.S. PATENT DOCUMENTS 4,803,550 A * 2/1989 Yabe et al. .................. 348/68
5,408,263 A * 4/1995 Kikuchi et al. .............. 348/68
5,749,830 A * 5/1998 Kaneko et al. ............. 600/160
6,078,353 A * 6/2000 Yamanaka et al. .......... 348/65

\* cited by examiner

Primary Examiner—Young Lee
(74) Attorney, Agent, or Firm—Ronald R. Snider; Snider & Associates

(57) ABSTRACT

The present invention is an electronic-endoscope apparatus for compensating for lack of light quantity caused by a delayed response from a light shielding mechanism when an all-pixel reading system is used. In the case of, for example, a moving image, this apparatus reads pixel mix data out from a CCD to reproduce motions faithfully. For a still image, this apparatus reads out all pixels obtained by the CCD during a single exposure period using a light shielding period set by a light shielding plate, and outputs this data to a mixing circuit via memories to form a pixel mix signal. This configuration enables a high-quality still image to be obtained. In this case, however, the light quantity may be insufficient due to a delayed response from the light shielding plate. Thus, during the exposure period for still-image formation, the lamp voltage is increased above a normal amount or the diaphragm aperture is increased in order to compensate for the shortage of light quantity. In addition, this light quantity compensation can be achieved by amplifying a video signal or controlling the increase of the electronic shutter time.

10 Claims, 19 Drawing Sheets

FIG.2(A)
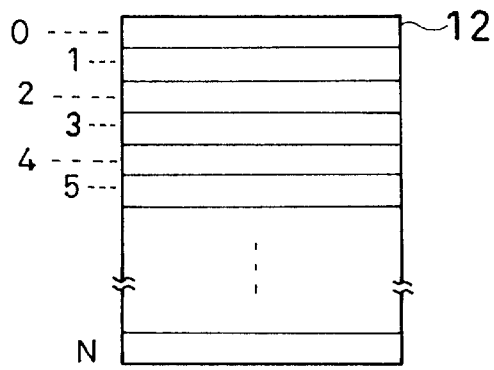
FIG.2(B)   FIG.2(C)
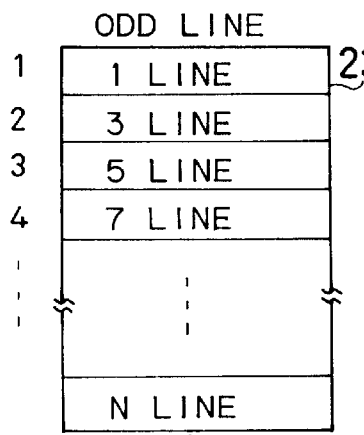  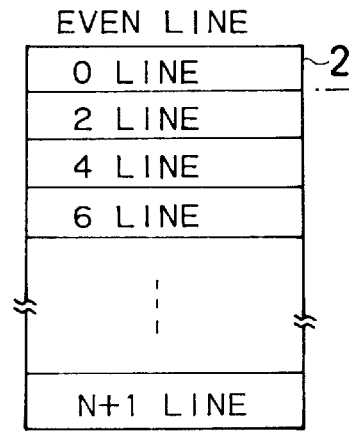
FIG.2(D)   FIG.2(E)
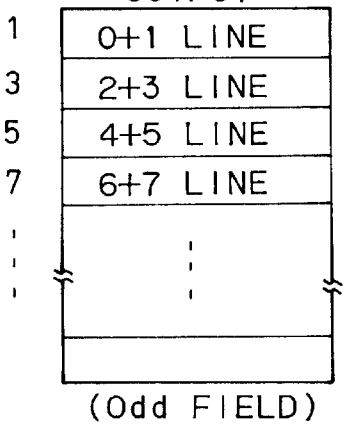  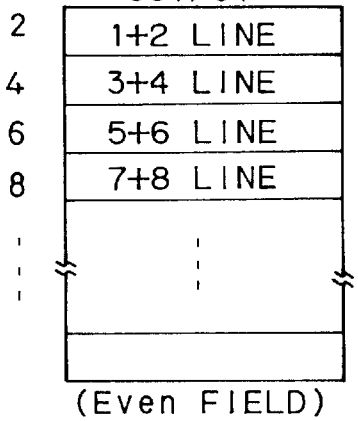

FIG. 3
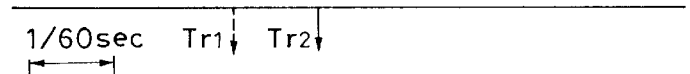
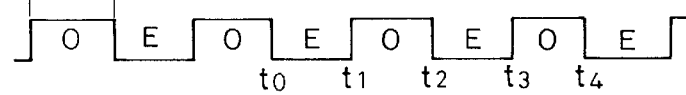
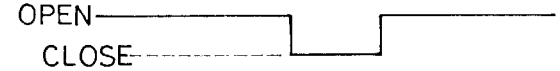
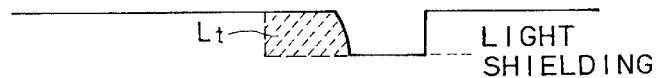
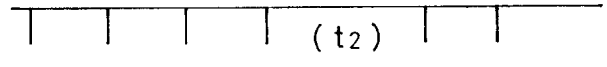
FIG. 4
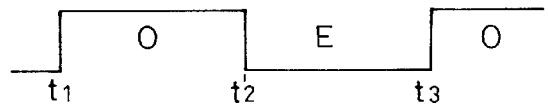
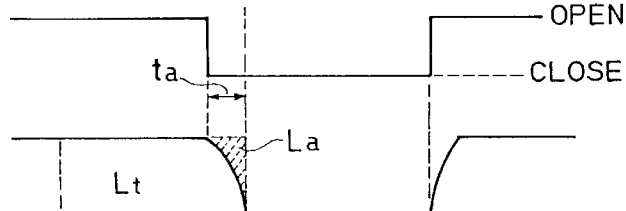
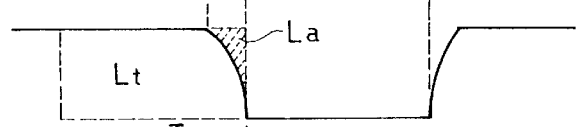
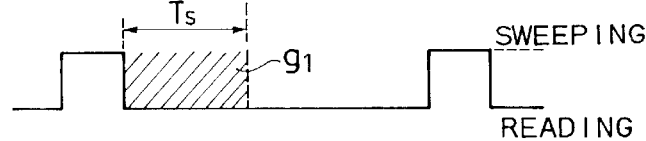

FIG. 9
FIG.9(B) O/E 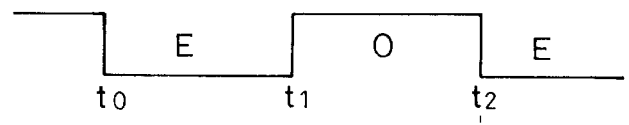
FIG.9(C) LIGHT SHIELDING PLATE 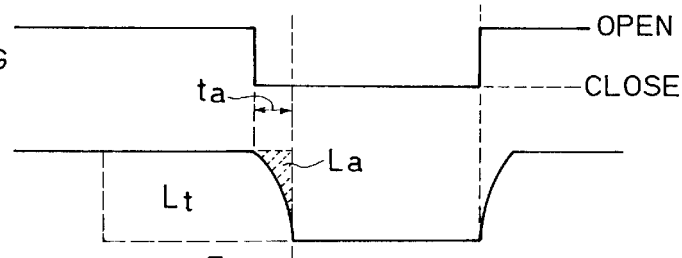
FIG.9(D) LIGHT 
FIG.9(G) ELECTRONIC SHUTTER 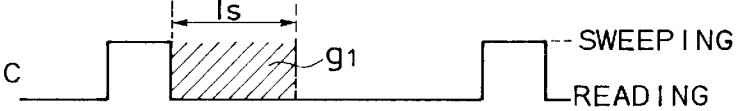

FIG.15
FIG.15(A) TRIGGER 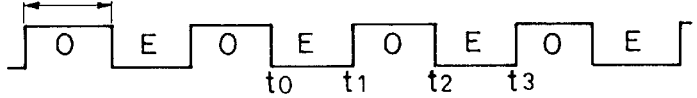
FIG.15(B) O/E 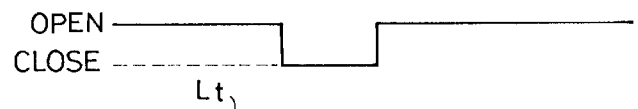
FIG.15(C) LIGHT SHIELDING PLATE 
FIG.15(D) LIGHT 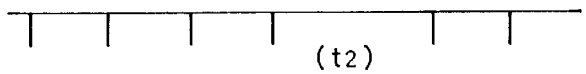
FIG.15(E) READ PULSE P1 (ODD LINE) 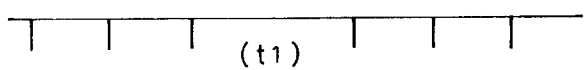
FIG.15(F) READ PULSE P2 (EVEN LINE)
FIG.15(G) ELECTRONIC SHUTTER 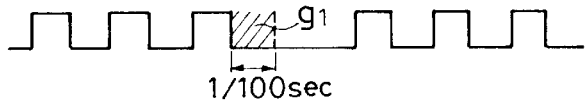
FIG.16
FIG.16(B) O/E 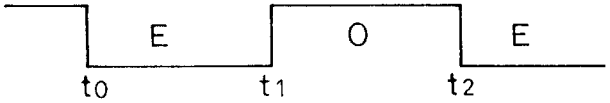
FIG.16(C) LIGHT SHIELDING PLATE 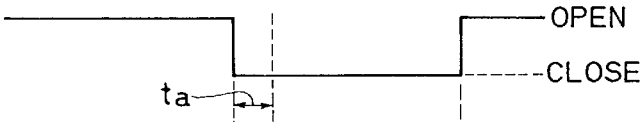
FIG.16(D) LIGHT 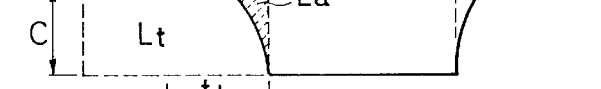
FIG.16(G) ELECTRONIC SHUTTER 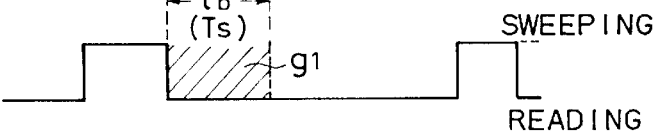

FIG. 20
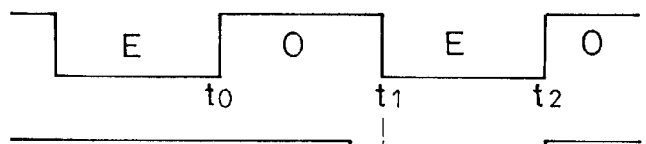
FIG.20(B) O/E SIGNAL
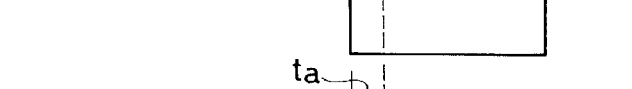
FIG.20(C) LIGHT SHIELDING PLATE
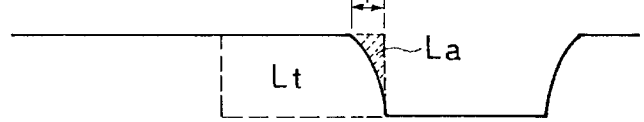
FIG.20(D) OPTICAL OUTPUT
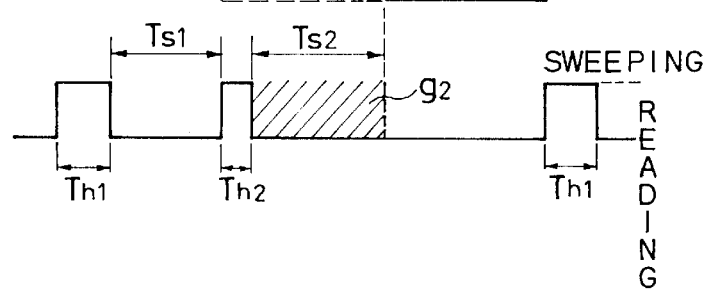
FIG.20(G) ELECTRONIC SHUTTER

PROIR ART

PROIR ART

ELECTRONIC-ENDOSCOPE LIGHT QUANTITY CONTROLLING APPARATUS

BACKGROUND OF THE INVENTION

This application claims the priority of Japanese Patent Application No. 10-54422 filed on Feb. 18, 1998, Nos. 10-55937 and 10-55938 and 10-55939 filed on Feb. 20, 1998, No. 10-96784 filed on Mar. 25, 1998 which are incorporated herein by reference.

The present invention relates to an electronic-endoscope light quantity controlling apparatus, and in particular, to the contents of light quantity control for adjusting the light quantity when a still image is selected using an electronic-endoscope that uses the conventional image mix reading system to form a moving image and that reads out all pixels accumulated in an image pickup device to form a still image.

DESCRIPTION OF THE PRIOR ART

In an electronic-endoscope apparatus, for example, CCD (Charge Coupled Device) is used as a solid image-pickup device, and this CCD is structured so as to obtain an image signal (video signal) by reading out charge accumulated in units of pixels by a photoelectric conversion device. In, for example, a simultaneous type electronic-endoscope apparatus, color filters are arranged in units of pixels on the top surface of the forgoing CCD to thereby obtain a color image.

FIG. 21 shows an arrangement state for the forgoing color filters, and Mg (magenta) and Cy (cyan) pixels are arranged on, for example, an even line, and G (green) and Ye (yellow) pixels are arranged on an odd line on a picked-up surface of CCD1 as shown. In this CCD1, accumulated charge (pixel signal) in units of pixels is to be obtained through these color filters.

According to a conventional color difference line sequential mix reading (pixel mix reading) system, accumulated charges of pixels on the upper and lower lines are added and mixed to be readout. For example, during first exposure, video signals of such odd field as a mixed signal of 0-line and 1-line, a mixed signal of 2-line and 3-line, . . . are read out, and during the second exposure, video signals of such even field as a mixed signals of 1-line and 2-line, a mixed signal of 3-line and 4-line, . . . are read out. Therefore, two lines of mixed signals of CCD1 become one line of signals of field image, and one odd or even field of data are to be obtained by one exposure.

FIG. 22 shows an operation of signals read out from the foregoing CCD1, and in an electronic-endoscope apparatus, an odd field and an even field are formed on the basis of the O (Odd)/E (Even) signal (field signal) for each 1/60 second (vertical synchronizing period) as shown in FIG. 22(A). Therefore, as shown in FIG. 22(B), signals are accumulated in accumulation (exposure) time T of an electronic shutter during the forgoing period of 1/60 second, and the accumulation mixed signal is read out during the next 1/60 second period. As a result, as shown in FIG. 22(c), an odd field signal, and an even field signal are to be obtained, and for example, the (n−1)th odd field signal becomes mixed signals of (0+1) line, (2+3) line, (4+5) line . . . which are shown on the left of FIG. 21, and the n-th even field signal becomes mixed signals of (1+2) line, (3+4) line, . . . which are shown on the right of FIG. 21.

These odd field signals and even field signals are interlace scanned to be formed as a one-frame image, and this image is displayed as a moving image on a monitor. Also, in the endoscope apparatus, a freeze switch is arranged in the operating unit, and when this freeze switch is depressed, a still image at the time is formed and displayed.

BRIEF SUMMARY OF THE INVENTION

In the foregoing simultaneous type electronic-endoscope apparatus, however, there is a time lag of 1/60 second between those odd field image and even field image which are used to form the one-frame image as shown in the foregoing FIG. 22(C), and if there is a shake of the endoscope itself, a movement of the object to be observed or the like during this period of time, there is the problem that the image quality (resolution, color shift, etc.) will be deteriorated when the still image is displayed. In other words, in the case of a moving image, it is often better to faithfully reproduce the movement and the like of the subject conversely by the foregoing mix reading system in the CCD1, but in the case of a still image, the resolution will be deteriorated.

Thus, the applicant sets a predetermined light shielding period and uses an all-pixel reading system for reading all pixels out from data obtained during one exposure using this period. However, due to a delay in a mechanical (gear) response from, for example, a light shielding plate that sets the light shielding period, the exposure may be insufficient during the period of time required to read out all pixels. That is, complete light shielding conditions are required during the light shielding period required to read out data, so the light shielding plate is activated slightly before the beginning of the light shielding period in view of its response time. This response operation (the operation performed until complete light shielding is achieved) may cause lack of light quantity.

The present invention has been achieved in the light of this problem, and its object is to provide an electric-endoscope light quantity controlling apparatus that can compensates for the lack of light quantity caused by delayed responses from a light shielding mechanism in an electronic-endoscope adapted to obtain a high-quality image using the light shielding period.

SUMMARY OF THE INVENTION

In order to achieve this object, this invention is characterized by comprising a driving circuit for driving an all-image reading system that reads out signals for all pixels accumulated on an image pickup device during a single exposure, light shielding means for intercepting light for a predetermined period of time in order to allow all pixels to be read out when the all-pixel reading system is selected, and light quantity compensating means for compensating for lack of light quantity caused by a delayed response from the light shielding means for a light shielding operation.

The light quantity compensating means may comprise light quantity controlling means for adjusting the outgoing light quantity from a light source during a period immediately before light shielding. The light quantity controlling means may variably control the lamp voltage or the aperture of a light quantity restrictor.

According to this configuration, for example, a freeze switch can be depressed to form a still image using the all-pixel reading system. In the all-pixel reading system, during a predetermined (the first) period of 1/60 second (a vertical synchronizing period), charges are accumulated due to exposure (the exposure time is arbitrary), and during the second period (in the next exposure), the odd lines in the image pickup device (CCD) are read out and stored in a predetermined memory. During the third period (1/60 second), the remaining even lines are read out and stored in a predetermined memory. To allow the even lines to be read out, the light shielding means intercepts light from a light source during the second period.

That is, if, during the second period during which accumulated charges in the odd lines are sequentially readout, subsequent charges are accumulated, as in the prior art, the remaining even lines cannot be read out. Thus, this invention eliminates the optical output during the second period and reads out the accumulated charges in the even lines during the third period. Thereby, the signals of all pixels of the image pickup device obtained by a single exposure can be read out.

Next, for example, video signals for the odd lines stored first in the memory are stored in a phase adjustment memory and are delayed by 1/60 second, and a mixing circuit then executes pixel mix processing between data for the odd and even lines. This pixel mix processing forms signals equivalent to those obtained by a pixel mix reading system operating when the image pickup device outputs signals, but is distinguished from this system in that it mixes pixels based on data obtained during a single exposure.

Pixel mix signals are used to form odd and even field signals, and a still image is displayed based on these video signals. Thus, the still image is formed based on the signals for all pixels obtained during the single exposure and has a high quality.

On the other hand, in a normal condition under which the freeze switch is not pressed, the pixel mix reading system operating when the image pickup device outputs has been selected, and pixels in two lines read out from the image pickup device as in the prior art are mixed together and output to provide a moving image that reproduces motions of an object faithfully.

In the light shielding operation for still images, however, the light quantity may become insufficient during the exposure period for still-image formation due to a delayed mechanical response from the light shielding plate, as described above. Thus, the light quantity controlling means according to this invention supplies a higher lamp lighting voltage than that of usual to the light source during the exposure for still-image formation to provide an appropriate light quantity, thereby enabling an appropriately bright still image. In addition, adjusting the diaphragm aperture enables an appropriate light quantity to be obtained.

Another aspect of this invention is characterized by comprising as the light quantity compensating means, amplifying means for amplifying an image signal output from the image pickup device by an amount corresponding to the shortage of light quantity. If the amplifying means comprises a digital signal processing circuit for converting an image signal output from the image pickup device into a digital signal for various digital processing including gamma correction, an amplifier may be provided in an analog-signal processing area located before or after the digital signal processing circuit.

According to this aspect, the amplifier amplifies an image signal output from the image pickup device by an amount corresponding to the shortage of light quantity to provide an appropriate light quantity, thereby enabling an appropriately bright still image to be displayed.

The amplifying means may comprise an arithmetic circuit provided in a digital signal area that processes image signals digitally, in order to multiply a digital image signal by an amount corresponding to the lack of light quantity caused by a delayed response from the light shielding means for a light shielding operation. Accordingly, also in the digital signal area, the lack of light quantity caused by the delayed response of a light shielding mechanism can be compensated by a multiplier.

Another aspect of this invention is characterized in that the apparatus comprises an electronic shutter circuit for controlling as a shutter time the time during which charges are accumulated in the image pickup device, and in that the amplifying means comprises an amplifier for amplifying an image signal output from the image pickup device by an amount corresponding to the lack of light quantity caused by a delay in a response form the light shielding means for a light shielding operation, using a gain corresponding to the shutter time set by the electronic shutter circuit.

Some electronic-endoscopes apparatus use an electronic shutter function, wherein the effect of the insufficient light quantity caused by a delayed mechanical response from the light shielding plate increases with decreasing shutter time, thereby forming an unstably bright still image. Thus, this invention uses the amplifier to amplify signals using a gain corresponding to the shutter time, that is, using a larger gain for a shorter shutter time, thereby providing an appropriate light quantity.

Another aspect of this invention is characterized by including as the light quantity compensating means an electronic shutter means for the charge accumulation time for the image pickup device during a period immediately before light shielding. According to this aspect, the electronic shutter means can, for example, control the exposure time for still images to be longer than that for moving images, thereby providing an appropriate light quantity to enable an appropriately bright still image to be displayed.

Yet another aspect of this invention is characterized by applying the invention of the all-pixel reading system to an electronic-endoscope and forming a moving image using a pixel mix reading system at the output of the image pickup device that mixes together and outputs vertically arranged lines of image signals accumulated in the image pickup device, while forming a still image using the all-pixel reading system that uses the light shielding period to read out signals for all pixels accumulated in the image pickup device during a single exposure period.

BRIEF DESCRIPTION OF THE DRAWINGS

FIGS. 2(A) to 2(E) are views showing image data read out between CCD of FIG. 1 and the mixing circuit;

FIGS. 3(A) to 3(C) are waveform diagrams showing a still image formation operation when the light quantity is insufficient according to the first embodiment;

FIGS. 4(B) to 4(G) are enlarged waveform diagrams showing part of the operation in FIG. 3;

FIGS. 9(B) to 9(G) are enlarged waveform diagrams showing part of the operation in FIG. 8;

FIGS. 15(A) to 15(G) are waveform diagrams showing an operation from light shielding to signal readout during still image formation according to the sixth embodiment;

FIGS. 16(B) to 16(G) are enlarged waveform diagrams showing part of the operation in FIG. 15;

FIGS. 20(B) to 20(G) are enlarged waveform diagrams showing part of the operation in FIG. 19;

DETAILED DESCRIPTION OF THE PREFERRED EMBODIMENTS

First Embodiment

Figure 1:
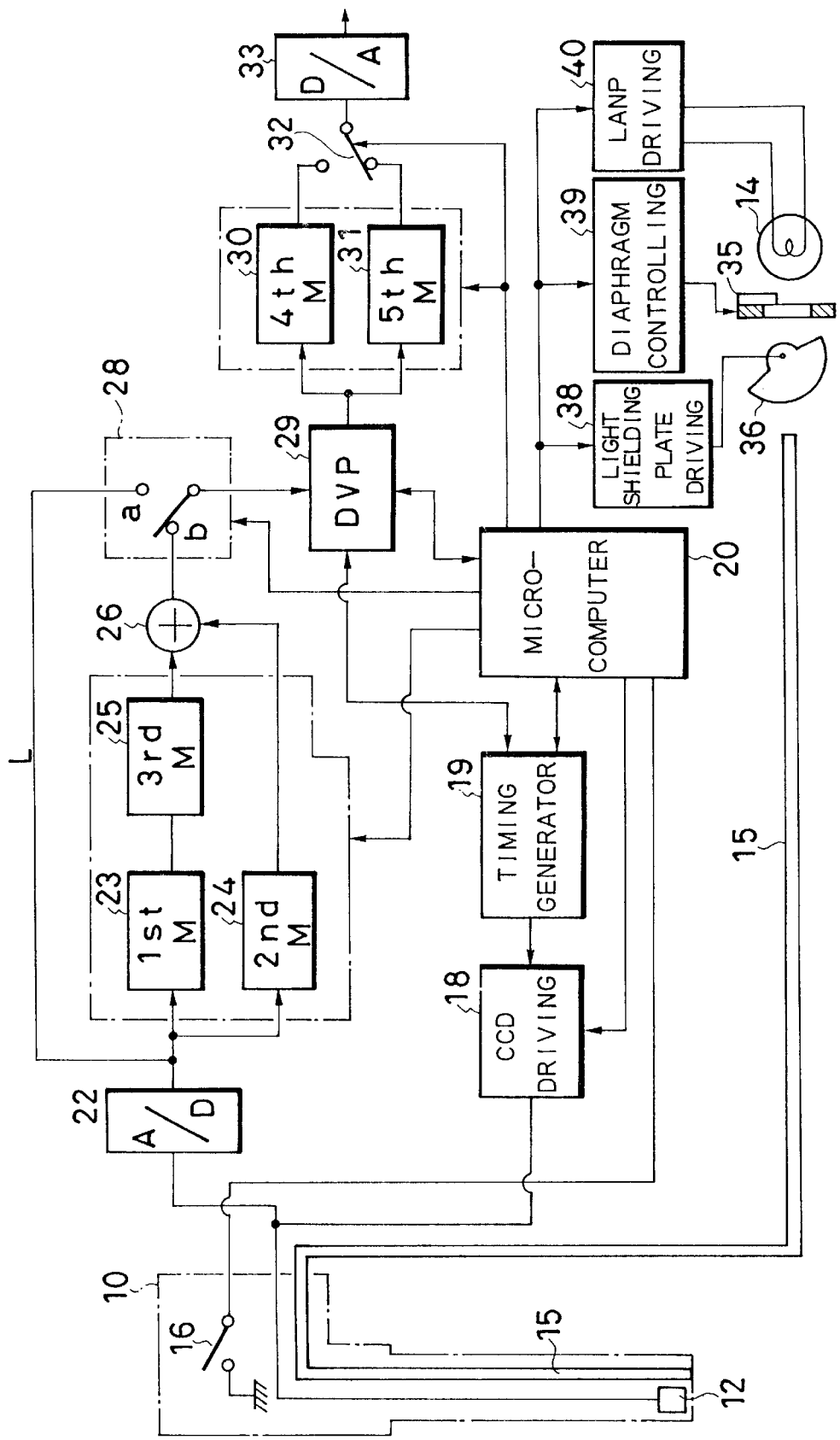
FIG. 1 is a block diagram showing the overall configuration of an electronic-endoscope apparatus according to a first embodiment of the present invention.
Figure 21:
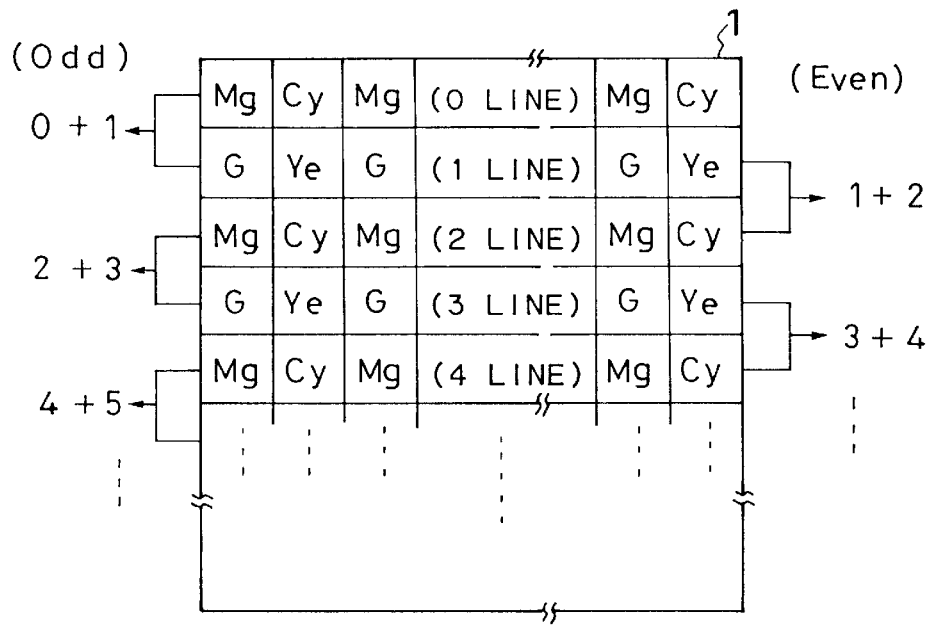
FIG. 21 describes a configuration of a color filter and a pixel mix readout according to a conventional CCD.

FIG. 1 shows a circuit configuration of an electronic-endoscope apparatus as a first embodiment, and this electronic-endoscope apparatus has such a structure that a scope (electronic-endoscope) 10 is connected to the processor device having an image processing circuit or a light source device (or apparatus obtained by making these devices integral) having a light source. This scope 10 is provided with CCD12 at whose tip end portion the same color filters as described in FIG. 21 are arranged, and with a light guide 15 for guiding light from the light source 14 to the tip end portion. Also, an operating unit for the scope 10 is provided with a freeze switch 16 for displaying a still image.

To the foregoing CCD12, a CCD driving circuit 18 for driving it is connected, and to the driving circuit 18, there are connected a timing generator 19 and a microcomputer 20 that provides various controls including reads from and writes to memories. To this microcomputer 20, an operation signal from the foregoing freeze switch 16 is inputted. The foregoing CCD driving circuit 18 inputs a timing signal under the control of the microcomputer 20 to control the driving of the pixel mix reading system at the output of CCD for moving images and the all-pixel reading system for still images. The driving circuit 18 may provide an electronic shutter function.

In the case of, for example, the all-pixel reading system, two types of pulses for driving accumulated data for all pixels, which have been accumulated in CCD12 by one exposure, into the odd line and the even line (staggering also temporarily) for reading out, are supplied from the foregoing CCD driving circuit 18, and on the basis of these pulses, control is performed so as to read out the foregoing odd line signals and even line signals from the CCD12 separately and successively. In this respect, one type read pulse is imparted to each line in the pixel mix reading system at the output of CCD.

In addition, after the CCD12 there are provided a first memory 23 for storing image data of the foregoing odd line via an A/D converter 22 in order to read out all pixels, a second memory 24 for storing image data of the even line, a third memory 25 for phase adjustments for storing the data of the foregoing first memory 23 as they are and delaying the read timing by 1/60 second, and a mixing circuit for still image 26. More specifically, all pixel signals obtained at the CCD12 are divided into data (video signal) of the odd line and data of the even line, and in this state, are once stored in the respective memories 23 and 24, but the odd line data of the first memory 23 are caused to be delayed by 1/60 second, whereby they are caused to have the same phase as the even line data stored in the second memory 24.

Thus, it becomes possible to read out both image data simultaneously, and in a mixing circuit 26 in the next stage, pixel data of the odd line in the third memory 25 and those of the even line in the second memory 24 can be added and mixed (pixel mixing process for still images). Therefore, in the case of still images, the same pixel mixed signal can be formed as the conventional color difference line sequential mix reading (pixel mix reading) system by this mixing circuit 26.

FIG. 2 shows the content of still image data formed in a circuit from the foregoing CCD12 to the mixing circuit 26. As shown in FIG. 2(A), horizontal lines from 0-line to N-line are provided correspondingly to a number of scanning lines in the CCD12, and the structure is arranged so that the pixel data of these horizontal lines are transferred to a transfer line for reading out. The data of odd lines (1, 3, 5 . . . line) in the foregoing CCD12 are stored in the first memory 23 (and the third memory 25) in FIG. 2(B), and the data of even lines (2, 4, 6, . . . line) are stored in the second memory 24 in FIG. 2(C).

The data of these memories 25 and 24 are pixel-mixed between lines in FIGS. 2(B) and 2(C) by the mixing circuit 26 as described above, and as shown in FIG. 2(D), add operation data of 0-line+1-line, 2-line+3-line, 4-line+5-line, . . . are outputted as Odd field data. In a state in which the read line of FIG. 2(C) has been shifted underneath by one line (read out from a position indicated by C1 in the figure), they are pixel-mixed between lines in FIGS. 2(B) and 2(C). As shown in FIG. 2(E), add operation data of 1-line+2-line, 3-line+4-line, 5-line+6-line, . . . are outputted as Even field data. In this respect, in this example, an odd number and an even number in lines of CCD12, and an odd number and an even number in fields for interlaced scanning are distinguished by representing them as ODD, EVEN, and Odd, Even, respectively.

In FIG. 1, at the subsequent stage of the forgoing mixing circuit 26, there is provided an image switching circuit 28 for switching between a moving image and a still image. An output from the A/D converter 22 is supplied to a terminal "a" of the image switching circuit 26 via a line L to form a moving image, while an output from the mixing circuit 26 is provided to its terminal "b". This image switching circuit 28 switches from terminal "a" to terminal "b" by the control of the microcomputer 20 when the forgoing freeze switch 16 is depressed. To this image switching circuit 28, there is connected a digital video processor (DVP) 29, and in this DVP 29, color signal processing using the same pixel mix reading system as before is performed, and for example, a color difference signal or a luminance signal is formed.

At the subsequent stage of this DVP 29, there are provided a fourth memory 30 for storing odd field data, a fifth memory 31 for storing even field data, a switching circuit 32 for switching between a terminal on the fourth memory 30 side and a terminal on the fifth memory 31 side, and a D/A converter 33. For example, for a still image, the fourth memory 30 stores odd field data comprising color difference signals into which the data in FIG. 2(D) has been converted, while the fifth memory stores even field data comprising color difference signals into which the data in FIG. 2(E) has been converted.

On the other hand, in a light source unit for supplying light to a light guide 15 arranged in the foregoing scope 10, there are arranged a diaphragm 35 and a light shielding plate (light shielding means) 36 between the foregoing light source lamp 14 and an incident end of the light guide 15. This light shielding plate 36 is constructed to rotate, for example, a semi-circular plate, and a driving circuit 38 is connected to rotationally drive the light shielding plate 36. In this example, this light shielding plate 36 intercepts light only for predetermined 1/60 second after the foregoing freeze switch 16 is depressed in a field O/E signal of a cycle of each 1/60 second.

Also, to the foregoing diaphragm 35, a diaphragm control circuit 39 is connected, and to the foregoing lamp 14, a lamp driving circuit 40 is connected. This diaphragm control circuit 39 is adapted to drive the diaphragm 35 on the basis of the luminance signal obtained by the foregoing DVP 29 so as to adjust the quantity of light outputted from the light source 14.

When a still image is selected, the lamp driving circuit 40 controls the lamp voltage under the control of the microcomputer 20. That is, at a predetermined point of time after the depression of the freeze switch 16, the circuit 40 increases the lamp (lighting) voltage of the lamp 14, for example, from 14 V to 15 V to increase the outgoing light quantity of the lamp 14 for a predetermined period of time (one field). This operation avoids lack of light quantity caused by a delayed response from the light shielding plate 36 for the subsequent light shielding period, that is, lack of light quantity during an exposure period for a still image immediately before the light shielding period.

Figure 5:
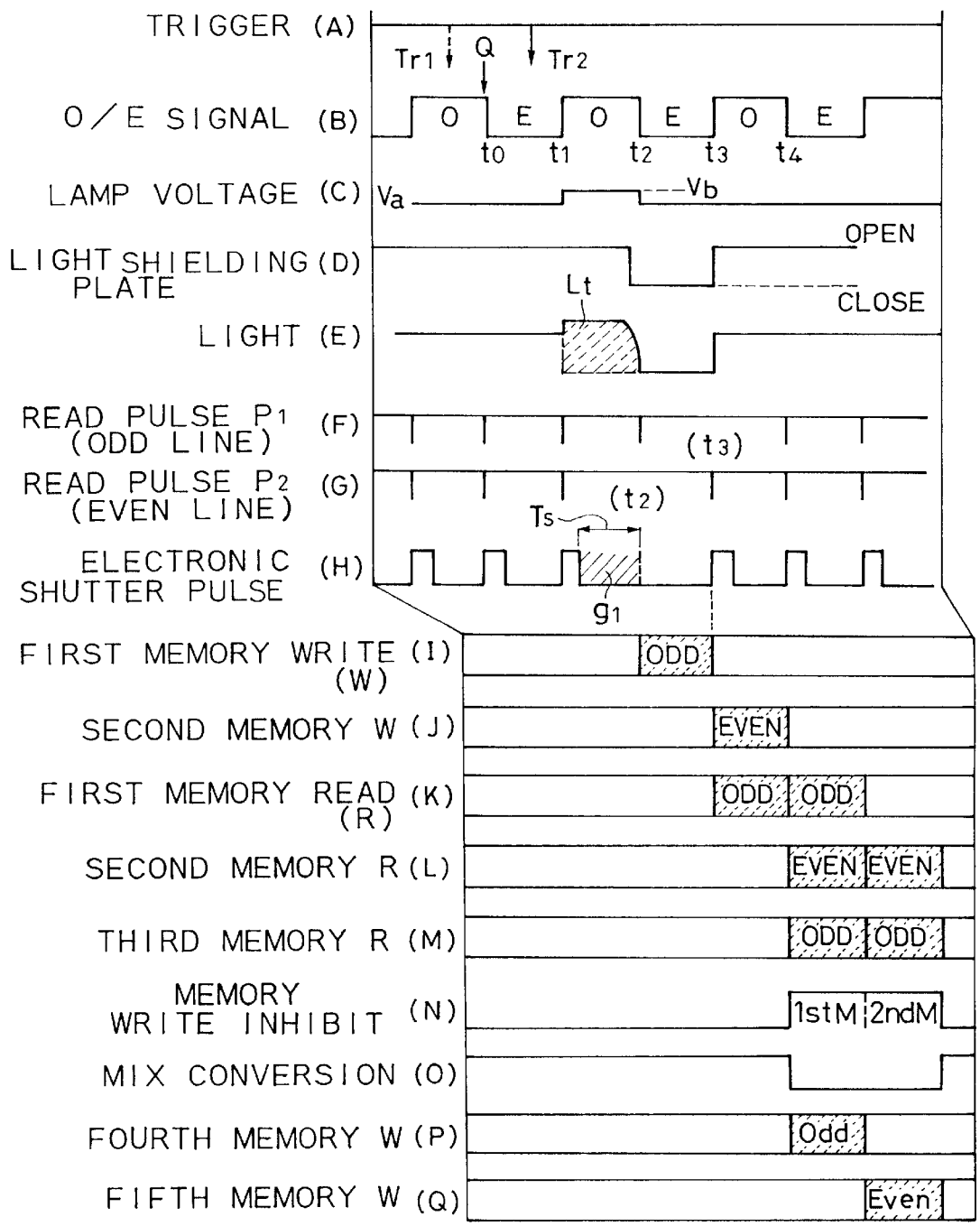
FIGS. 5(A) to 5(Q) are explanatory drawings showing a still image formation operation according to the first embodiment.

The first embodiment is constructed as described above, and the operation will be described with reference to FIGS. 3 to 5 (each figure coincides at point Q temporally). As shown in FIG. 3(B), a timing signal for forming a one-field image in 1/60 second is used as field O (Odd)/E (Even) signal in the same manner as before. First, under normal conditions, it is set so that moving image processing, that is, the pixel mix reading system at the output of CCD is executed, the light shielding plate 36 in the foregoing FIG. 1 is arranged at a position which does not intersect light, and light from the light source 14 is irradiated from the tip end portion into the object to be observed through the light guide 15.

By this light irradiation, an image for the object to be observed is obtained in the CCD12 at the tip end portion, and charge corresponding to the image light is accumulated in the CCD12. Pixels between the vertical lines are added to this accumulated charge through a driving pulse from the CCD driving circuit 18 to be read out, and a pixel mixed signal described in FIG. 21 is outputted. This moving image signal is supplied from an A/D converter 22 to an image switching circuit 28 through a through line L. The image switching circuit 28 then switches to the terminal "a" side to supply the moving image signal to the DVP 29. The following operation of the DVP 29 is similar to the conventional one, and the moving image is displayed on a monitor on the basis of the odd field signal stored in the fourth memory 30 and the even field signal stored in the fifth memory 31.

On the other hand, when the freeze switch 16 of the scope 10 in FIG. 1 is depressed, the microcomputer 20 switches the image switching circuit 28 to the terminal "b" side to switch the foregoing pixel mix reading system to the all-pixel reading system for still images by the microcomputer 20. For example, when it is assumed that trigger Tr1 (or Tr2) due to the freeze switch 16 is given as shown in FIG. 3(A), the foregoing light shielding plate 36 obstructs the optical path only for about 1/60 after the time just before (details are described after) a fall time (t2) passing through a rise time (t1) of next O/E signal [FIG. 3(C)], and during the period an output light from a light source part is intercepted as shown in [FIG. 3(D)]. Accordingly, image data, whose all pixels are read out, become charge accumulated in CCD12 by optical output Lt during the immediately preceding period of 1/60 second to the period of time during which the light has been intercepted.

That is, FIG. 3(E) is a read pulse P1 on the ODD line shown in FIG. 2(B), FIG. 3(F) is a read pulse P2 on the EVEN line shown in FIG. 2(C), and the ODD line data and EVEN line data can be successively read out from the CCD12 according to the read pulse P1 missing a pulse at t3 and the read pulse P2 missing a pulse at t2 as shown in the drawings. Accordingly, the ODD line is read out during the foregoing light shielding period (t2 to t3), and the EVEN line is read out during the next period (t3 to t4).

FIG. 3(G) shows an electronic shutter pulse that sweeps away charges accumulated during the rise period while reading out charges accumulated during the fall period. Thus, the still-image data (accumulated charges) is obtained by the exposure for a portion g1 after the charges have been swept away, and the CCD driving circuit 18 reads out the charges for all these pixels. In addition, sweeping is not executed during the light shielding period (t2 to t3) after g1.

During the light shielding period, the Odd line data must be read out to establish a complete light shielding condition in order to prevent charges from accumulating in the CCD12. To do this, the light shielding plate is controlled as shown in FIG. 4. FIG. 3 is an enlarged view of part of FIG. 3 (B, C, D, G). Taking into account the mechanical response delay time ta of a driving section (gears) of the light shielding plate 36, the light-shielding-plate controlling pulse in FIG. 4(C) is formed to rise earlier by the time ta. Thus, when the light shielding plate 36 is driven, light from the light source unit attenuates in a quadratic-curve manner during the response period ta before the complete light shielding condition is established. Consequently, an optical output Lt for a still image is subjected to a loss corresponding to a light quantity La, so as shown in FIG. 4(G), the light quantity is less than a required level by La even in the exposure for the section g1 obtained during an actual charge accumulation time Ts, in contrast to moving images.

Thus, this example controls the outgoing light quantity during the period between t1 and t2 to be larger than that obtained when a moving image is selected. This operation is shown in FIG. 5. As shown in FIG. 5(C), the lamp voltage set by the lamp driving circuit 40 is controlled to increase from a voltage Va for moving images (for example, 14 V) to a voltage Vb (for example, 15V, Vb>Va) only during the period between t1 and t2. Accordingly, as shown in FIG. 5(E), the optical output Lt during this period also increases to enable compensation for the shortage of light quantity [La in FIG. 4(D)] in the actual charge accumulation section (the period Ts) shown in the still image of FIG. 5(H).

The ODD and EVEN line data-obtained from the CCD12 using this exposure control are written to the first and second memories 23 and 24 as shown in FIGS. 5(I) and 5(J), respectively, under the control of the microprocessor 20. Next, as shown in FIGS. 5(K) and 5(L), the ODD line data of the first memory 23 and the EVEN line data of the second memory 24 are read out twice each respectively, and the ODD line data are stored in the third memory 25 in order to adjust the phase of 1/60 second. Accordingly, as understood from FIGS. 5(L) to 5(M), the data for the ODD line and those for the EVEN line are to coincide in phase (timing).

Each data read out from the foregoing memories 25 and 24 in this way is pixel-mixed by the mixing circuit 26, and in order to enable this pixel mixing to be performed in this example, the first memory 23 and the second memory 24 are write-inhibited as shown in FIG. 5(N). In the same period as this, the pixels are mixed and converted [FIG. 5(O)], and added data of 0-line+1-line, 2-line+3-line, . . . shown in FIG. 2(D) are first outputted, and are stored in the fourth memory 30 as the Odd field data [FIG. 5(P)]. Next, added data of 1-line +2-line, 3-line+4-line, . . . shown in FIG. 2(E) are outputted, and are stored in the fifth memory 31 as the Even field data [FIG. 5(Q)].

The moment when these Odd field data and Even field data are read out, a switching circuit 32 selects the fourth memory 30 and the fifth memory 31 so that each field data is alternately outputted. These field data are outputted to the monitor through a D/A converter 33, and images are displayed on the monitor through interlaced scanning. As a result, as regards still images, the images will be displayed on the basis of the all pixel data obtained during the same exposure, and images with high image-quality and optimal brightness can be obtained. Therefore, even if there is any shake of the endoscope itself in 1/60 second or any movement of the object to be observed, it, it becomes possible to observe a sharp still image less affected by it.

Second Embodiment

Figure 6:
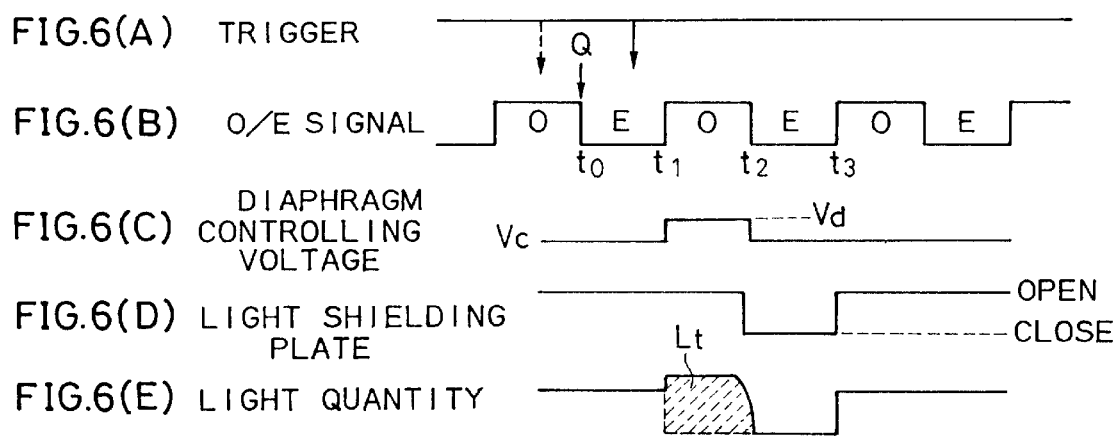
FIGS. 6(A) to 6(E) are waveform diagrams showing an operation of a light quantity controlling means according to a second embodiment.

FIG. 6 shows an operation performed when the diaphragm 35 is used, as a second embodiment of the light quantity controlling means for compensating for the lack of light quantity during the still-image exposure. In this example, a diaphragm controlling circuit 39 in FIG. 1 forms a diaphragm controlling voltage, which is shown in FIG. 6(C). That is, the DVP29 inputs a luminance signal to the microcomputer 20, which then sends a controlling signal to the diaphragm controlling circuit 39. While the circuit 39 is controlling a diaphragm aperture by providing an illustrated diaphragm controlling voltage Vc to a diaphragm driving circuit based on the controlling signal, a controlling voltage Vd higher than the current diaphragm controlling voltage Vc is provided during the period between t1 and t2. The diaphragm controlling voltage Vd may be obtained by adding a specified voltage to 2the current controlling voltage or increasing the current controlling voltage by a predetermined rate (for example, 20 to 30%).

Such controlling of the diaphragm 35 can also increase the diaphragm aperture and thus the outgoing light quantity Lt during the period for still-image formation as shown in FIG. 6(E), thereby compensating for the lack of light quantity [La in FIG. 4(D)] to provide appropriately bright still images.

As described above, since the first and second embodiments increase the outgoing light quantity from the light source during the period immediately before light shielding, the endoscope adapted to provide high-quality still images and moving images that faithfully reproduce motions can compensate for the lack of light quantity caused by a delayed response from the light shielding means for an operation, thereby forming appropriately bright still images.

Third Embodiment

Figure 7:
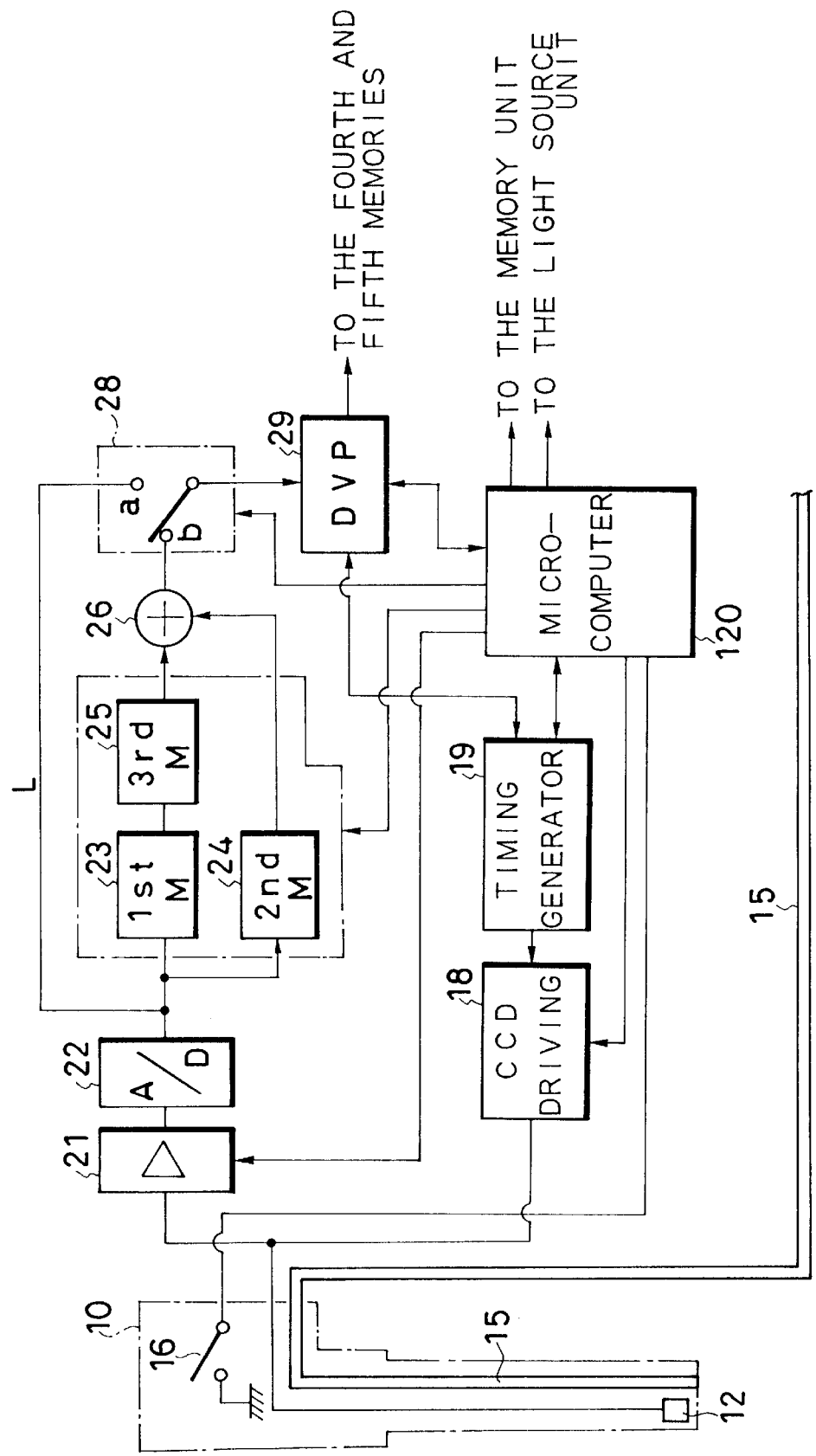
FIG. 7 is a block diagram showing a configuration of an exposure controlling apparatus according to a third embodiment.

FIG. 7 shows a configuration of part an electric-endoscope apparatus according to a third embodiment that compensates for the lack of light quantity using an amplifier. In FIG. 7, the scope 10, processor, and light source unit are configured mostly in the same manner as in FIG. 1, and a CCD driving circuit 18 for driving the CCD12 shown in FIG. 21 and comprising a color filter and a microcomputer 120 for providing various controls including writes to and reads from the memories are provided to execute driving control for the pixel mix reading system at the output of the CCD for moving images and the all-pixel reading system for still images.

An amplifier 21 for amplifying an image signal to compensate for insufficient light quantity that may occur when a still image is selected is provided after the CCD12, and may comprise an automatic gain circuit (AGC) that is normally provided in the apparatus. That is, a still-image signal (voltage) is amplified by an amplifying rate $Y(1+\alpha)$ higher than a normal amplifying rate Y by $(1+\alpha)$, during a two-field period after the depression of the freeze switch 16 (the vertical synchronization period). This operation compensates for insufficient light quantity caused by a delayed response from the light shielding plate 36 for the subsequent light shielding period, that is, the lack of exposure for the still image immediately before the light shielding period.

The first memory 23, the second memory 24, the third phase-adjusting memory 25 for delaying read timings by 1/60 second, the still-image mixing circuit 26, the image switching circuit 28, and the DVP 29 are provided after the amplifier 21 via the A/D converter 22. The fourth and fifth memories 30 and 31 for storing Odd and Even field data as described in FIG. 1 are arranged after the DVP29. In addition, the light shielding plate 36 that intercepts light for a predetermined 1/60 second after the depression of the freeze switch 16 is located in the light source unit for supplying light to the tip of the scope 10 via the light guide 15.

Figure 8:
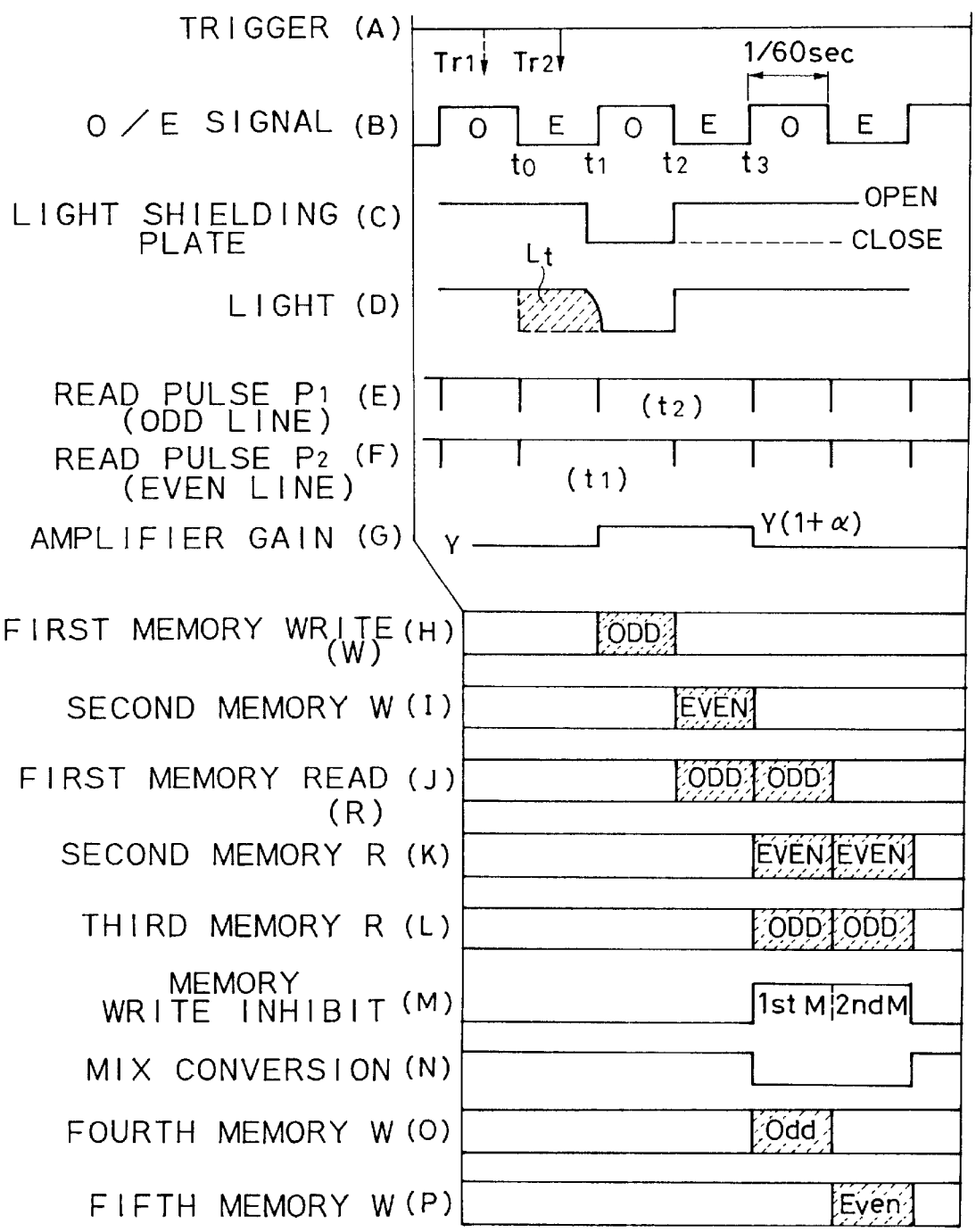
FIGS. 8(A) to 8(P) are explanatory drawings showing a still image formation operation according to the third embodiment.

The third embodiment has this configuration and is normally set to execute moving image processing, that is, the pixel mix reading system at the output of the CCD. When, however, the freeze switch 16 is depressed, the microcomputer 20 switches the image switching circuit 28 to the terminal "b" side to switch the image mix reading system to the all-image reading system for still images. When, for example, a trigger Tr1 (or Tr2) is provided using the freeze switch 16 as shown in FIG. 8(A), the light shielding plate 36 intercepts the optical path for about 1/60 second immediately before a rise (t1) of the subsequent O/E signal [FIG. 8(C)], and during this period, the optical output from the light source unit is intercepted, as shown in FIG. 8(D). Thus, image data for which all pixels are read out is charges accumulated by the CCD12 from the optical output Lt during the 1/60 second period immediately before the shielding period.

That is, FIG. 8(E) shows a read pulse P1 from the odd lines shown in FIG. 2(B) and FIG. 8(F) shows a read pulse P2 from the even lines shown in FIG. 2(C). As shown in the figures, the read pulse P1 free of the pulse during t2 and the read pulse P2 free of the pulse during ti allow the ODD and EVEN line data to be sequentially read out.

To set the shielding period, the shielding plate is controlled as shown in FIG. 9. This control is almost the same as in FIG. 4. The light shielding control pulse in FIG. 9(C) forms a pulse that rises earlier by an amount of time corresponding to the mechanical response delay time ta of the driving section, so a loss of light quantity La occurs in light from the light source unit, as shown in FIG. 9(D). Thus, the third embodiment uses the amplifier 21 to execute signal amplification corresponding to the shortage of light quantity. That is, if the gain for moving images is defined as Y, the still image signal (voltage) is amplified using the gain of $Y(1+\alpha)$ during the 2-field period between t1 and t3, as shown in FIG. 8(G). Foregoing ( is the rate of the shortage of light quantity to the required level, and this rate can be increased to compensate for light quantity La corresponding to the lack in optical output Lt [FIG. 4(D)] obtained during still-image formation.

Under the control of the microcomputer 20, the ODD line data obtained by the CCD12 using this exposure control is written to the first memory 23 as shown in FIG. 8(H), while the EVEN line data is written to the second memory 24 as shown in FIG. 8(I). Subsequently, write inhibition and image mix conversion are carried out during the same period as shown in FIGS. 8(M) and (N), followed by the display of the still image on the monitor (in the same manner as in FIG. 5).

Fourth Embodiment

Figure 10:
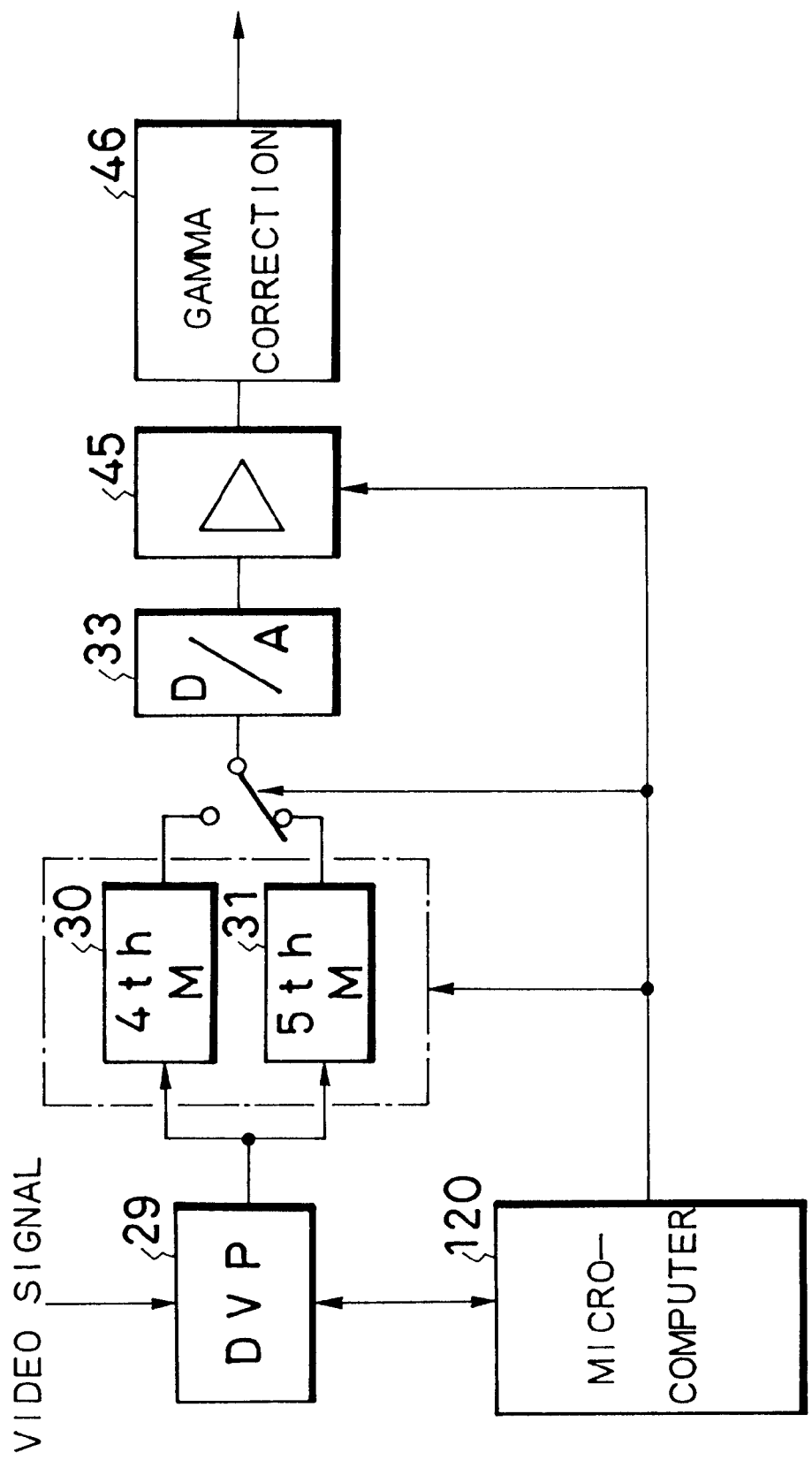
FIG. 10 is a block diagram showing a configuration of an exposure controlling apparatus according to a fourth embodiment.
Figure 11:
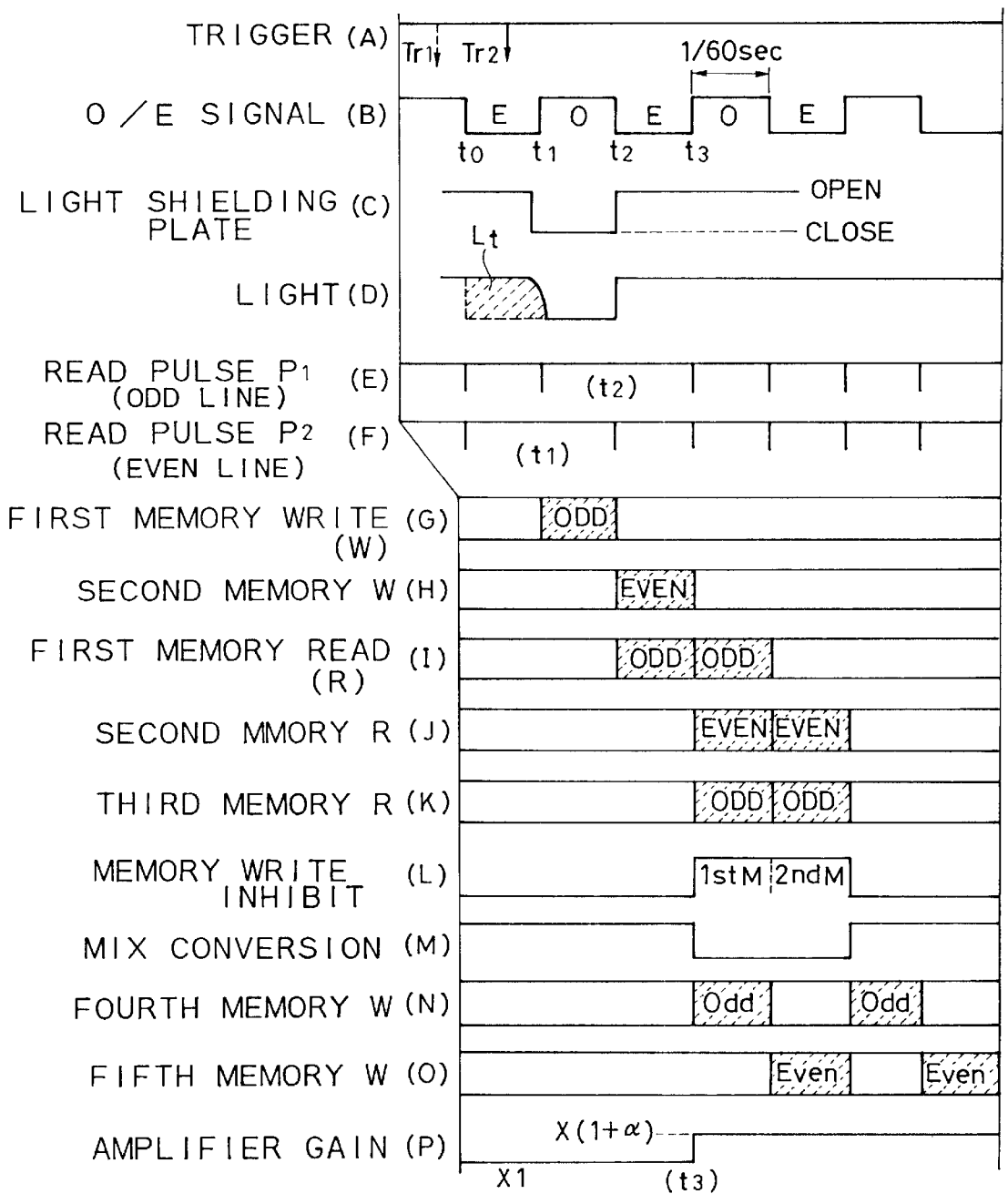
FIGS. 11(A) to 11(P) are explanatory drawings showing a still image formation operation according to the fourth embodiment.

FIGS. 10 and 11 show a configuration of a fourth embodiment. According to this embodiment, an amplifier 45 is provided after the D/A converter 33, and a gamma correction circuit 46 is connectively located after the amplifier 45. As in the previous embodiments, in order to compensate for insufficient light quantity using the amplifier 45 (21), the amplifier 45 must be connectively located before the gamma correction circuit 46 so as not to reduce the effect of gamma correction used to reproduce faithful colors on a color TV.

According to this configuration, from t3 until still image display is finished as shown in FIG. 11(P), the image signal is amplified using the gain of $(1+\alpha)$ to increase the ODD and EVEN field signals shown in FIGS. 11(N) and (M), respectively, by $(1+\alpha)$ times. Thereby, insufficient light quantity La is compensated similarly as the third embodiment, and consequently a still image with good brightness can be obtained.

Fifth Embodiment

Figure 12:
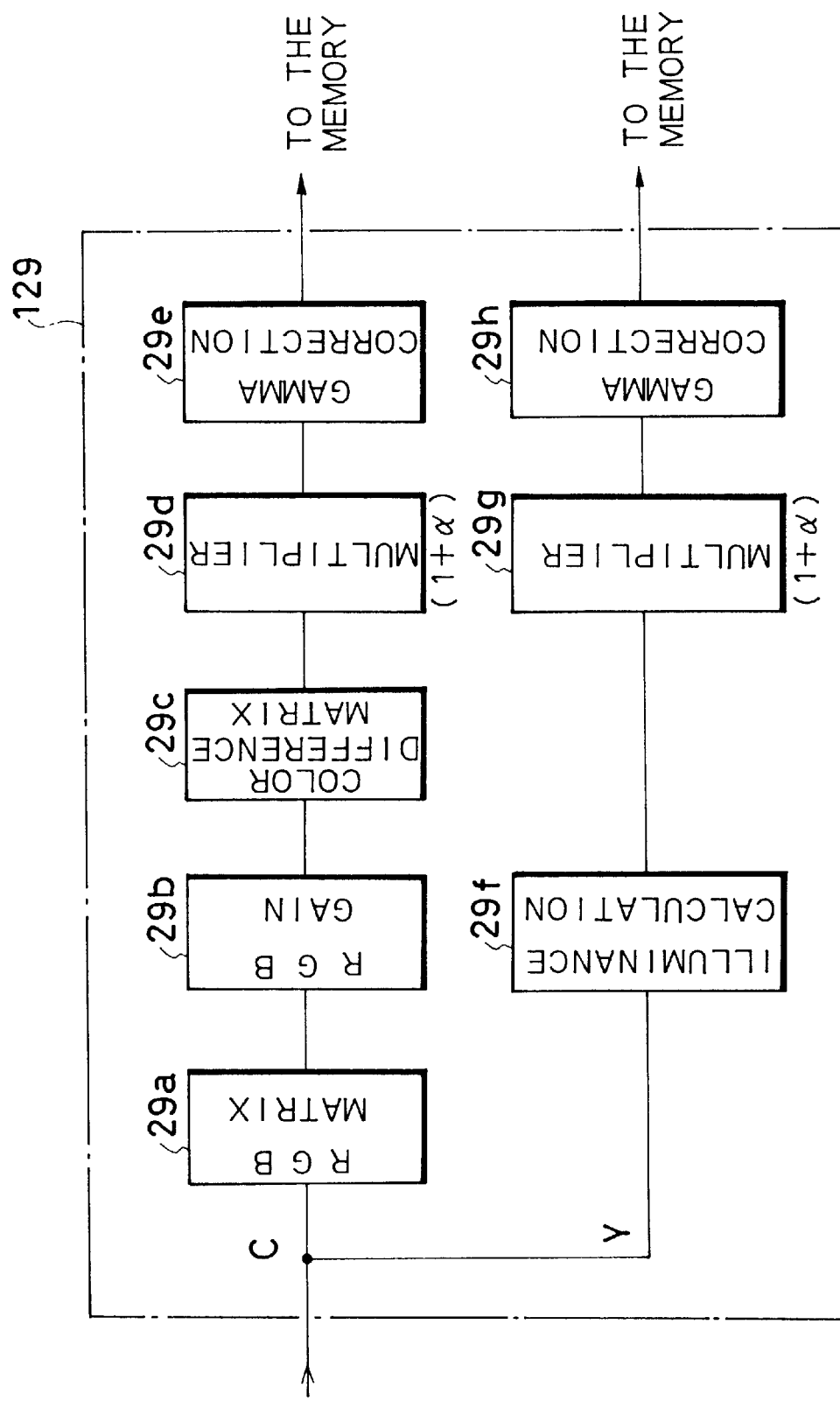
FIG. 12 is a block diagram showing a circuit configuration of a fifth embodiment.
Figure 13:
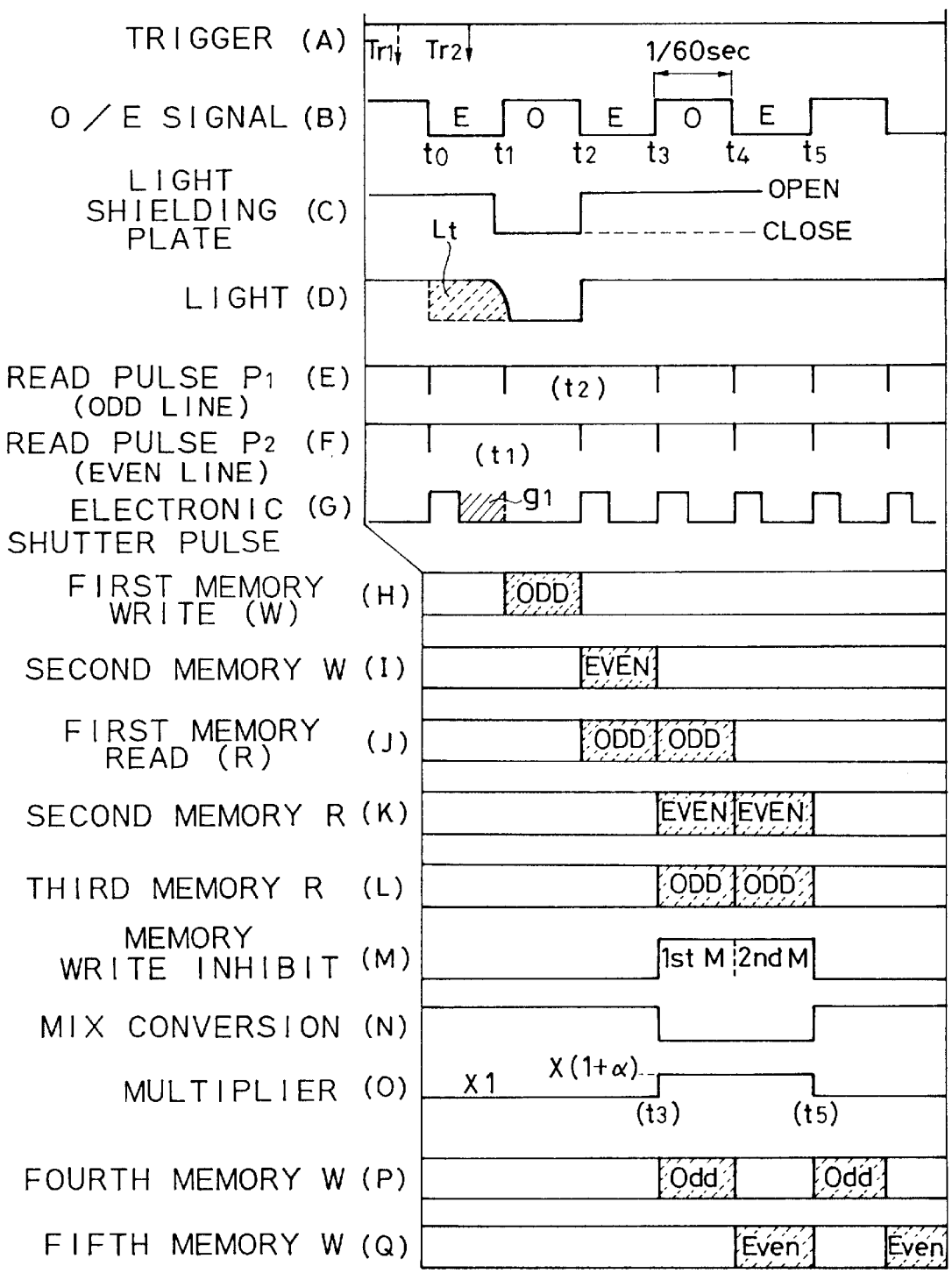
FIGS. 13(A) to 13(Q) show a still image formation operation according to the fifth embodiment.

FIG. 12 shows a main circuit in a digital video processor (DVP) according to a fifth embodiment. The other configuration of this embodiment is the same as in FIG. 1, and the fifth embodiment amplifies signals in a digital area to compensate for lack of light quantity. In FIG. 12, a color signal (C) processing line in a DVP 129 includes a red (R) green (G), and blue (B) matrix circuit 29a, an RGB gain circuit 29b, a color difference matrix circuit 29c for calculating, for example, a signal corresponding to R-Y (an illuminance signal) or B-Y, and a gamma correction circuit 29e. An illuminance signal (Y) processing line includes an illuminance calculation circuit 29f and a gamma correction circuit 29h. Multipliers 29d and 29g are connected to compensate the lack of light quantity due to the delayed response of a light shielding mechanism between the color difference matrix circuit 29c and the gamma correction circuit 29e and between the illuminance calculation circuit 29f and the gamma correction circuit 29h, respectively.

Under the control of the microcomputer 120, the multipliers 29d and 29g multiplies the magnitudes of the color difference signal and the illuminance signal by $(1+\alpha)$ times only for the still-image data obtained during a predetermined 2-field period (a vertical synchronization period) after the depression of the freeze switch 16. This operation compensates for insufficient light quantity caused by a delayed response from the light shielding plate 36 for the subsequent light shielding period, that is, the lack of exposure for the still image immediately before the light shielding period.

According to the fifth embodiment, the operation between FIGS. 13(A) to 13(G) is performed to form a still image as in each of the above embodiments, also resulting in the light quantity loss La described in FIG. 9. That is, during the exposure in the section g1 in FIG. 13(G), the light quantity is less than the required level by La, in contrast to moving images. Thus, in the DSP 129 according to this example, a color difference signal formed by the color difference matrix circuit 29C is supplied to the multiplier 29d, and an illuminance signal formed by the illuminance calculation circuit 29f is supplied to the multiplier 29g. The multipliers 29d and 29g then multiplies each signal by $(1+\alpha)$ times for the 2-field period between t3 to t5, as shown in FIG. 13(O). That is, $\alpha$ is the rate of the shortage of light quantity to the required level, and this rate ( can be increased to compensate for light quantity La corresponding to the lack in optical output Lt [FIG. 9(D)] obtained during still-image formation.

The color difference signal and illuminance signal multiplied in this manner are supplied to the gamma correction circuits 29e and 29h, where the signals are subjected to gamma correction to reproduce faithful colors on a color TV. The multipliers 29d and 29g preferably carry out signal amplification for insufficient light quantity before the gamma correction circuit 46 so as to prevent the effect of gamma correction from decreasing.

As a result, the still image is displayed based on the all-pixel data obtained during the same exposure period, thereby providing high-quality and optimally bright images.

Sixth Embodiment

Figure 14:
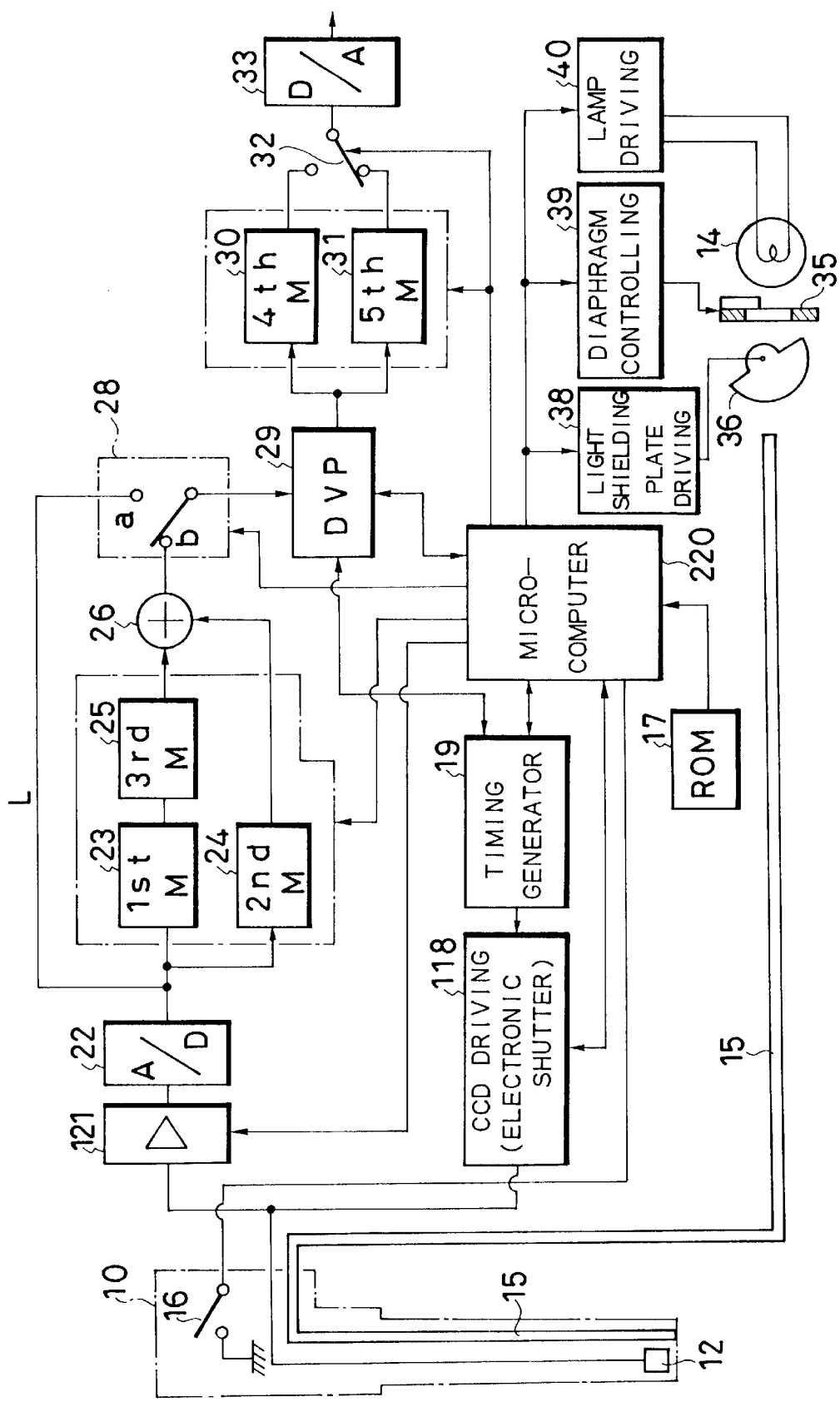
FIG. 14 is a block diagram showing the overall configuration of an apparatus according to a sixth embodiment.

FIG. 14 shows a configuration of an electronic-endoscope apparatus according to a sixth embodiment. The sixth embodiment is an electronic-endoscope apparatus providing an electronic shutter function, and a signal amplifier compensates for lack of light quantity. In FIG. 14, the electronic-endoscope apparatus includes a CCD driving circuit 118 for driving the CCD12 and having an electronic shutter function for controlling the exposure time based on the shutter speed; and an amplifier 121 located after the CCD12 to amplify video signals to compensate for insufficient light quantity that may occur when a still image is selected. These circuits are controlled by a microcomputer 220.

The CCD driving circuit 118 controls the exposure time as an electronic shutter time and according to this example, allows a number of shutter times to be selected (the number of shutter times that can be selected is arbitrary) so that the shutter time can be changed to enable the inside of an observed object to be photographed depending on conditions such as motion. In addition, the amplifier 121 may comprise an automatic gain circuit (AGC) that is normally provided in the apparatus. When the freeze switch 16 is depressed, the amplifier 121 amplifies still-image signals (voltage) during, for example, a 2-field period (a vertical synchronization period) using an amplifying rate (a gain) Y that depends on the electronic shutter time (speed), under the control of the microcomputer 220.

That is, according to this example, data for the gain Y corresponding to the electronic shutter time is stored in a ROM 17, and the microcomputer 220 determines the current set shutter time and reads out from the ROM 17 the gain corresponding to this shutter time to control the amplifying rate for the amplifier 121. Although described below in detail, video signals are amplified by, for example, using Y=1.11 when the shutter time set by the CCD driving circuit 118 is 1/100 second or using Y=1.25 when the shutter time is 1/200 second (only the lack of light quantity is taken into consideration). This configuration compensates for insufficient light quantity caused by a delayed response from the light shielding plate 36 for the subsequent light shielding period, that is, the lack of exposure for the still image immediately before the light shielding period. The other configuration is similar to that in the first embodiment.

Figure 22:
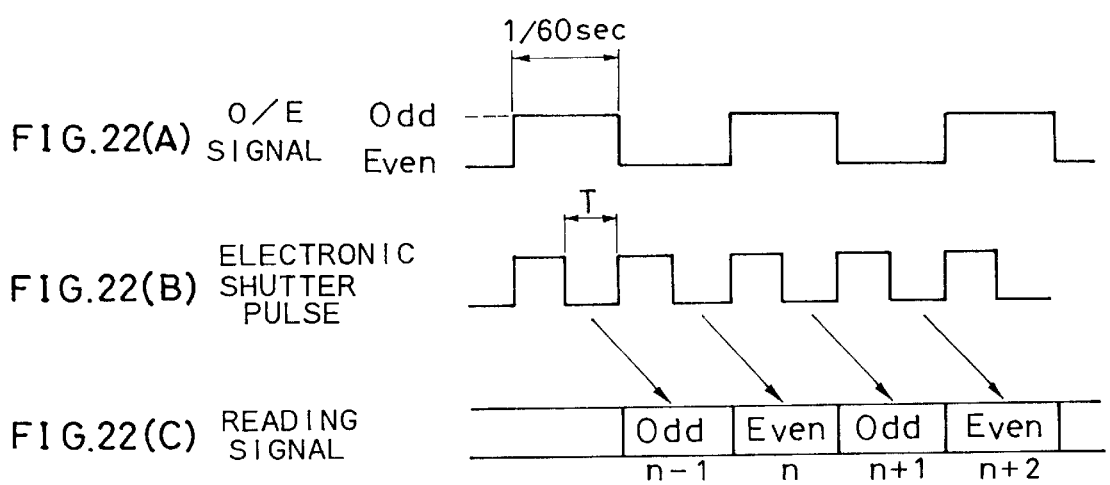
FIGS. 22(A) to 22(C) are explanatory drawings showing an operation performed by a conventional CCD.

The sixth embodiment is configured as described above, and is normally set to execute moving image processing, that is, the pixel mix reading system at the output of the CCD. The light shielding plate 36 in FIG. 14 is located so as not to intercept light, and light from the light source lamp 14 passes through the light guide 15 to enter an observed object through its tip for irradiation, thereby outputting a pixel mix signal, which has been described in FIG. 22. This moving image signal is supplied to the image switching circuit 28 from the A/D converter 22 via a through line L and is output to the monitor via the DVP 29 and the fourth and fifth memories 30 and 31. The monitor then displays the moving image.

On the other hand, when the freeze switch 16 of the scope 10, shown in FIG. 14, is depressed, the pixel mix reading system is switched to the all-pixel reading system for still images. That is, the light shielding plate 36 blocks the optical path for about 1/60 second immediately before the rise (t1) of the O/E signal, as shown in FIG. 15(C), and during this period, light output from the light source unit is intercepted, as shown in FIG. 15(D). The read pulses P1 and P2 in FIGS. 15(E) and (F) cause the ODD and EVEN line data to be sequentially read out from the CCD12. FIG. 15(G) shows an operation of the electronic shutter. The still-image data (accumulated charges) read out from the CCD12 is obtained by the exposure g1 corresponding to the shutter time of about 1/100 second after the charges have been swept away, and sweeping is not executed during the light shielding period (between t1 and t2) after the exposure g1.

During this light shielding period, the light shielding plate is controlled as shown in FIG. 16 to establish a complete light shielding condition in order to avoid accumulating unwanted charges in the CCD12. Taking into account the mechanical-response delay time ta from the driving section (gears) of the light shielding plate 36, the light shielding plate controlling pulse in FIG. 16(C) forms a pulse that inverts earlier by this amount of time ta. Light from the light source unit attenuates in a quadratic-curve manner during the response period ta before the complete light shielding condition is established as shown in FIG. 16(D). Consequently, the optical output Lt for a still image is subjected to a loss corresponding to the light quantity La, so as shown in FIG. 16(G), the light quantity is less than the required level by La even in the exposure in the section g1 obtained during an actual shutter time (charge accumulation time) tb, in contrast to moving images.

The rate of the lack of light quantity varies with the electronic shutter time. If, for example, the shutter time tb is 1/60 second, the light quantity per unit time, that is, the height C of the signal in FIG. 16(D) is 4V, and the response delay time ta is 2 mS (sec), the amount of charges in the CCD 12 for moving image data can be expressed as follows:

$$tb \times C = \frac{1}{60}[mS] \times 4[V] \approx 66.67[mVS]$$

If the attenuation curve during the response period ta is assumed to be a straight line, the amount of charges for still-image data can be expressed as follows:

$$tb \times C - (\frac{1}{2}) ta \times C = \frac{1}{60}[mS] \times 4[V] - (\frac{1}{2}) \cdot 2[mS] \times 4[V]$$

$$\approx 62.67[mVS]$$

Thus, the illuminance of the still image is 94% of the illuminance of the moving image (6% less).

In addition, if the shutter time tb is 1/100 second, the amount of charges for moving image data can be expressed as follows:

$$tb \times C = \frac{1}{100}[mS] \times 4[V] = 40[mVS]$$

The amount of charges for still-image data can be expressed as follows:

$$tb \times C - (\frac{1}{2}) ta \times C = \frac{1}{100}[mS] \times 4[V] - (\frac{1}{2}) \cdot 2[mS] \times 4[V] = 36[mVS]$$

Thus, the illuminance of the still image is 90% of the illuminance of the moving image (10% less).

Likewise, if the shutter time tb is 1/100 second, the amount of charges for the moving image data is 20 [mVS] and the amount of charges for still-image data is 16 [mVS] so the illuminance of the still image is 80% of the illuminance of the moving image (20% less). As a result, the illuminance decreases with decreasing shutter time.

Figure 17:
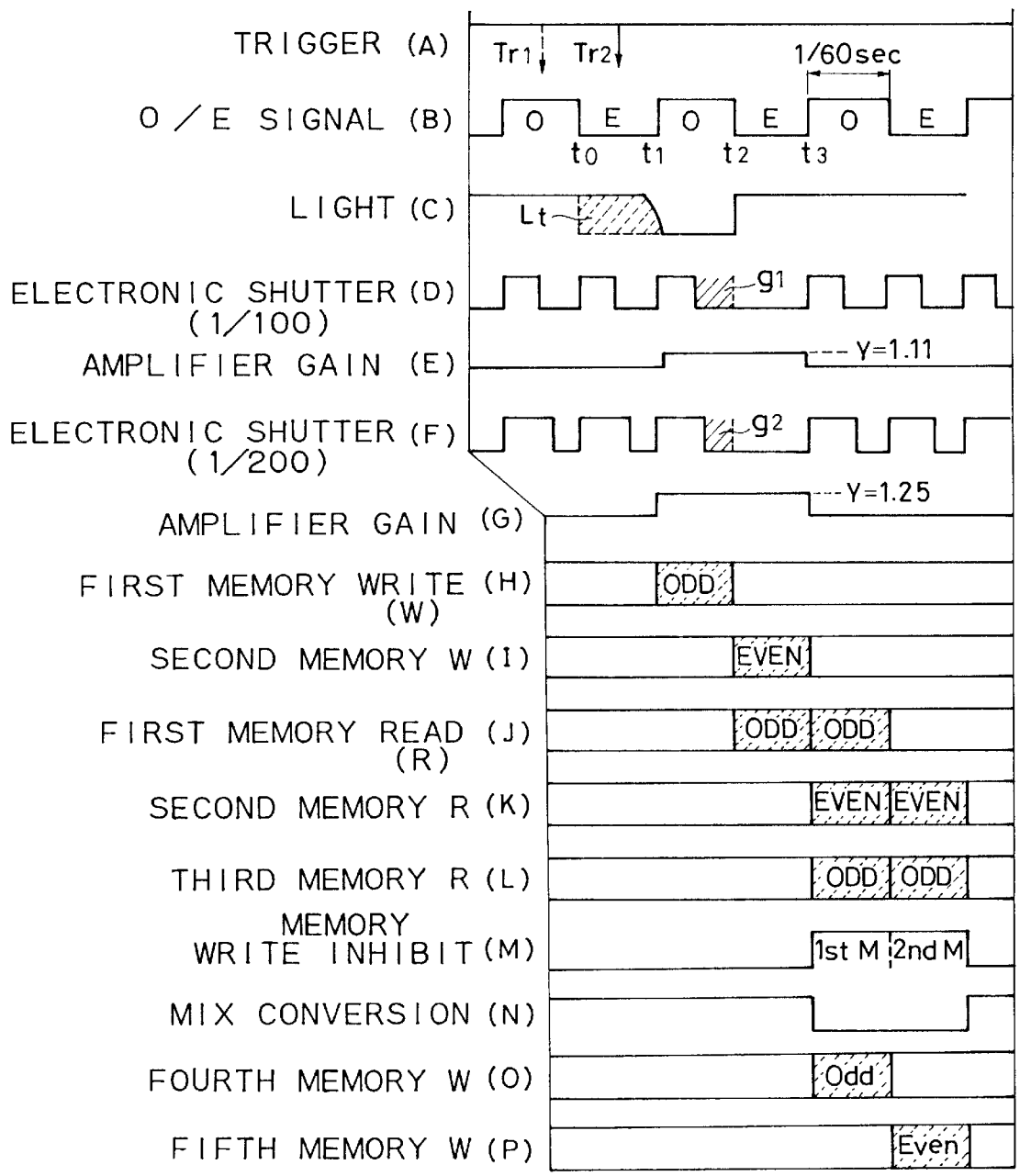
FIGS. 17(A) to 17(P) are explanatory drawings showing a still-image formation operation according to the sixth embodiment.

Thus, according to this example, the microcomputer 220 determines the current electronic shutter time to read out from the ROM 17 the gain Y corresponding to this shutter time, and the amplifier 121 executes signal amplification corresponding to the shortage of light quantity. This operation is shown in FIG. 17, and FIG. 17(D) shows an operation for the 1/100 second shutter time (exposure g1) as in FIG. 15(G). In this case, the amplifier 121 amplifies still image signals (voltages) using a gain of Y=1.11 times as large as the gain for moving images as shown in FIG. 17(E). This configuration can compensate for the above 10% shortage, that is, the light quantity La corresponding to the lack in FIG. 16(D).

FIG. 17(F) shows an operation performed if an image is obtained using a shutter time of 1/200 second and exposure g2. In this case, still image signals (voltages) are amplified using a gain of Y=1.25 times as large as that for moving images, as shown in FIG. 17(G). Consequently, the light quantity can be increased to compensate for the above 20% shortage, that is, the light quantity loss La.

The subsequent operation between FIGS. 17(H) to 17(P) is similar to that in the fifth embodiments, and the field data read out from the fourth and fifth memories 30 and 31 is used to display the still image on the monitor. As a result, the still image is displayed based on the all-pixel data obtained during the same exposure period, thereby providing a high-quality and appropriately bright image. Thus, even if the endoscope is shaken or the observed object moves during the 1/60 second, this does not significantly affect the resulting image and a clear still image can be observed.

Although the sixth embodiment locates the amplifier 121, this amplifying means may be provided after the D/A converter 33 as described above or may be provided in the digital signal processing area.

Seventh Embodiment

Figure 18:
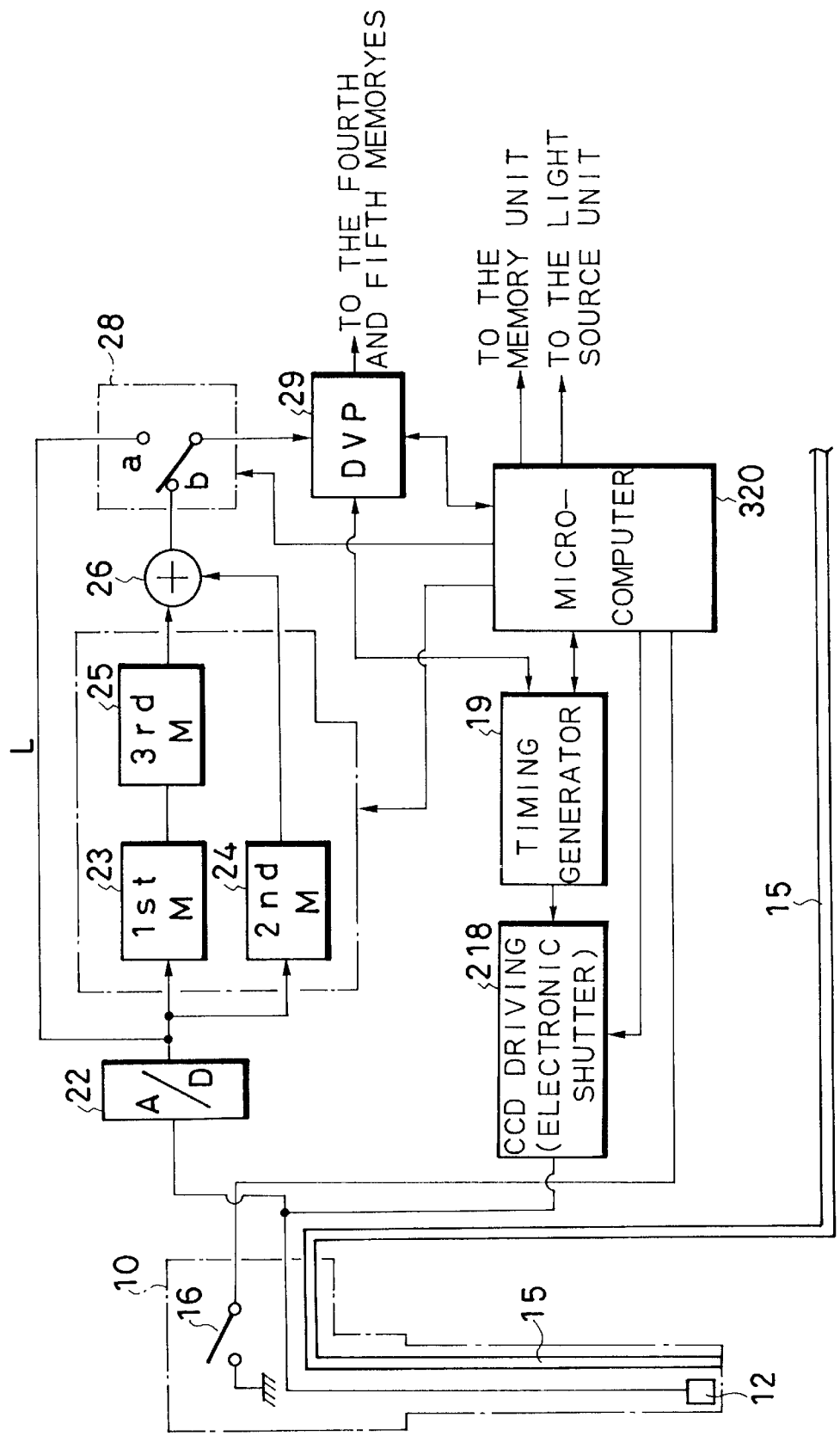
FIG. 18 is a block diagram showing a configuration of an electronic-endoscope apparatus according to a seventh embodiment.
Figure 19:
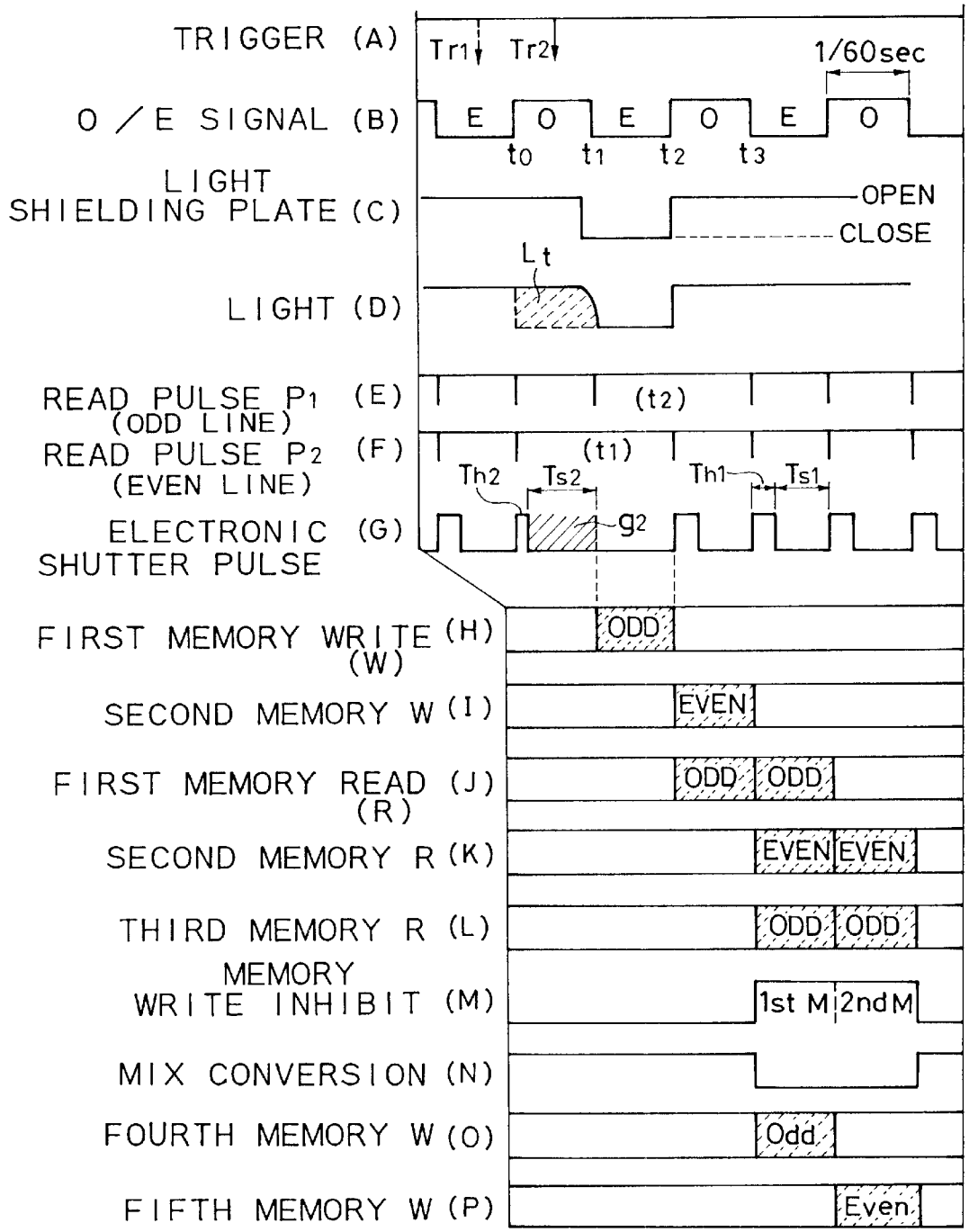
FIGS. 19(A) to 19(P) are explanatory drawings showing a still-image formation operation according to a seventh embodiment.

FIG. 18 shows a circuit configuration of an electronic-endoscope apparatus according to the seventh embodiment. This embodiment uses the electronic shutter function to compensate for insufficient light quantity. In FIG. 18, a CCD driving circuit 218 for driving the CCD12 and providing an electronic shutter function is connected to this apparatus, and the timing generator 19 and a microcomputer 320 for providing various controls including writes to and reads from the memories are connected to the driving circuit 218. The other configuration is similar to that of the first embodiment.

When a still image is selected, the CCD driving circuit 218 controls the electronic shutter for adjusting the light quantity, under the control of the microcomputer 320. That is, as in the sixth embodiment, this embodiment does not normally control the electronic shutter in adjusting the brightness, but controls the charge accumulation time (TS2) for the CCD12 to be longer than that for moving images (TS1), during a predetermined period of time (a still-image exposure period) after the depression of the freeze switch 16. This configuration compensates for insufficient light quantity caused by a delayed response from the light shielding plate 36 for the subsequent light shielding period, that is, the lack of exposure for the still image immediately before the light shielding period.

In addition, in order to read out all pixels, this apparatus includes after the CCD12 and the A/D converter 22, the first memory 23 for storing the ODD-line image data, the second memory 24 for storing the EVEN-line image data, the third phase-adjusting memory 25 for storing the data from the first memory 23 without changes to delay the read timing by 1/60 second, and the still-image mixing circuit 26.

The seventh embodiment is configured as described above, and normally executes moving image processing to read out a pixel mix signal from the CCD12. This moving image signal is supplied from the A/D converter 22 to the image switching circuit 28a through the through line L. After processing by the DVP 29 has been finished, the signal is supplied to the monitor via the fourth and fifth memories 30 and 31. During this moving image formation, the electronic shutter time is essentially fixed.

On the other hand, when the freeze switch 16 in FIG. 18 is depressed, the microcomputer 320 switches the image switching circuit 28 to the terminal "b" to switch the pixel mix reading system to the all-pixel reading system for still images in order to perform the operation shown in FIGS. 19(A) to (F), as in the above embodiments. In this case, when the shielding plate 36 is driven, light from the light source unit attenuates in a quadratic-curve manner, resulting in a loss corresponding to the light quantity La, as described in FIG. 16. The seventh embodiment, however, controls the electronic shutter in such a way as to increase the exposure during the period between t0 and t1, as shown in FIGS. 19(G) and 20(G). That is, when a moving image is selected, a charge sweeping period Th1 and a charge accumulation (exposure) period TS1 are set, whereas when a still image is selected, a charge sweeping period Th2 shorter than Th1 is set for the period between t0 and t1. This configuration can provide a charge accumulation period TS2 (exposure g2) longer than TS1 to compensate for the shortage of the optical output Lt corresponding to the light quantity La shown in FIG. 20(D). The subsequent image processing is similar to that in the other embodiments.

Although the seventh embodiment has been described in conjunction with the aspect that does not provide the electronic shutter function based on an illuminance signal when a moving image is selected, this invention is also applicable to a conventional endoscope that provides the electronic shutter function to adjust the screen brightness. In this case, the sweeping timing may be specified to be larger than the current set value of the variably controlled charge accumulation time by a predetermined rate (for example, 20 to 30%).

In addition, although each of the above embodiments uses for a moving image, the mix reading system at the output of the CCD12 to reproduce motions of an object faithfully, the all-pixel reading system using the light shielding period may also be used to form a moving image in order to obtain a clear image free of blurring.

What is claimed is:

1. An electronic-endoscope light quantity controlling apparatus comprising:
   an image pickup driving circuit for executing a pixel mix reading system at the output of an image pickup device that mixes and outputs vertically arranged lines of image signals accumulated in the image pickup device to form a moving image and an all-pixel reading system that reads out all pixels accumulated in said image pickup device during a single exposure using a light shielding period set by a light shielding apparatus in order to form a still image;
   wherein the light shielding apparatus has a light shielding plate that shades a light shielding period next to an exposure period (as field period) for reading out signals of all pixels when the all-pixel reading system is selected, and said light shielding plate is actuated before the light shielding period in consideration of the response delay time of said light shielding plate; and
   light quantity compensating means for compensating for lack of light quantity caused in the exposure period for the still image immediately before the light shielding period by a delayed response from said light shielding plate for a shielding operation.

2. The electronic-endoscope light quantity controlling apparatus according to claim 1 wherein light quantity controlling means for adjusting the outgoing light quantity from a light source unit during a period immediately before shielding is provided as said light quantity compensating means.

3. The electronic-endoscope light quantity controlling apparatus according to claim 2 wherein said light quantity controlling means variably controls the voltage of a light source lamp.

4. The electronic-endoscope light quantity controlling apparatus according to claim 2 wherein said light quantity controlling means variably controls the aperture of a light quantity diaphragm.

5. The electronic-endoscope light quantity controlling apparatus according to claim 1 wherein signal amplifying means is provided as said light quantity controlling means, the signal amplifying means amplifying an image signal output from said image pickup device by an amount corresponding to the lack of light quantity caused by a delayed response from said light shielding means for a shielding operation.

6. The electronic-endoscope light quantity controlling apparatus according to claim 5 comprising a digital signal processing circuit for converting the image signal output from said image pickup device into a digital signal and for performing various kinds of digital processing including gamma correction, wherein:

an amplifier is provided as said signal amplifying means in an analog signal processing area located before the digital signal processing circuit.

7. The electronic-endoscope light quantity controlling apparatus according to claim 5 comprising a digital signal processing circuit for converting said image signal into a digital signal to execute various signal processing, wherein:

an amplifier is provided as said signal amplifying means in an analog signal processing area located after the digital signal processing circuit.

8. The electronic-endoscope light quantity controlling apparatus according to claim 5 wherein an arithmetic circuit is provided as said signal amplifying means, the arithmetic means being provided in the digital signal processing area that converts the image signal output from said image pickup device into a digital signal for processing, in order to multiply the digital image signal by an amount corresponding to the lack of light quantity caused by a delayed response from said light shielding means for a shielding operation.

9. The electronic-endoscope light quantity controlling apparatus according to claim 5 comprising an electronic shutter circuit for controlling as a shutter time the accumulation time for charged accumulated in said image pickup device, wherein:

said signal amplifying means is an amplifier for amplifying the image signal output from said image pickup device by an amount corresponding to the lack of light quantity caused by a delayed response from said light shielding means for a shielding operation, using a grain that amplifies depending on the shutter time set by said electronic shutter circuit.

10. The electronic-endoscope light quantity controlling apparatus according to claim 1, wherein an electronic shutter circuit for controlling the accumulation time for charged accumulation in said image pickup device is provided as light quantity controlling means.

* * * * *